US012753842B2

(12) United States Patent
Painter

(10) Patent No.: US 12,753,842 B2
(45) Date of Patent: Oct. 6, 2026

(54) SEAT FOR GATE VALVE

(71) Applicant: Chevron U.S.A. Inc., San Ramon, CA (US)

(72) Inventor: Jay Patrick Painter, League City, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 19/053,938

(22) Filed: Feb. 14, 2025

(65) Prior Publication Data

US 2025/0189043 A1 Jun. 12, 2025

Related U.S. Application Data

(62) Division of application No. 18/202,119, filed on May 25, 2023, now abandoned.

(60) Provisional application No. 63/458,604, filed on Apr. 11, 2023.

(51) Int. Cl.
*F16K 3/02* (2006.01)
*F16K 27/04* (2006.01)

(52) U.S. Cl.
CPC .......... *F16K 3/0236* (2013.01); *F16K 3/0254* (2013.01); *F16K 27/044* (2013.01)

(58) Field of Classification Search
CPC .... F16K 3/0236; F16K 3/0254; F16K 3/0227; F16K 27/044
USPC .......................................................... 251/328
See application file for complete search history.

(56) References Cited

U.S. PATENT DOCUMENTS

| | | | | |
|---|---|---|---|---|
| 2,777,664 A * | 1/1957 | Bryant | F16K 3/0236 251/174 |
| 4,208,035 A | 6/1980 | Alvarez | |
| 4,519,582 A * | 5/1985 | Freeman | F16K 3/02 251/360 |
| 4,645,179 A * | 2/1987 | Ali | F16K 3/0227 251/327 |
| 5,445,359 A | 8/1995 | Beson | |
| 5,722,637 A * | 3/1998 | Faramarzi | F16K 25/005 251/190 |
| 10,378,659 B2 * | 8/2019 | Scott | F16K 3/0236 |

(Continued)

FOREIGN PATENT DOCUMENTS

| | | |
|---|---|---|
| DE | 8007048 U1 | 8/1980 |
| DE | 29519459 U1 | 3/1996 |

(Continued)

*Primary Examiner* — Jessica Cahill
(74) *Attorney, Agent, or Firm* — Smith & Woldesenbet Law Group, PLLC

(57) ABSTRACT

A gate valve can include a valve body, a bore positioned within the valve body, where the bore traverses a width of the valve body and comprises an inlet and an outlet, and a gate slidably disposed within the bore. The gate valve can further include a seat disposed around the bore and adjacent to the gate and the valve body, where an inner surface of the second piece is adjacent to the gate, where an outer surface of the first piece is adjacent to the valve body, where the first piece and the second piece are adjacent to each other, where a spring system includes a cavity disposed between the first piece and the second piece and a spring section, where the spring section protrudes outward relative to the second piece and moves inward to reduce a volume of the cavity when the gate contacts the spring section.

17 Claims, 17 Drawing Sheets

(56) References Cited

U.S. PATENT DOCUMENTS

| | | | | |
|---|---|---|---|---|
| 10,914,383 | B2 * | 2/2021 | Kustermans | F16J 15/3232 |
| 11,047,486 | B2 | 6/2021 | Farquharson et al. | |
| 11,435,001 | B2 | 9/2022 | Kalimuthu | |
| 2009/0294715 | A1 | 12/2009 | Meyer | |
| 2013/0001456 | A1 | 1/2013 | Rayment et al. | |
| 2014/0183396 | A1 * | 7/2014 | Hunter | F16K 3/0227<br>251/328 |
| 2018/0238456 | A1 * | 8/2018 | Farquharson | F16K 3/0236 |

FOREIGN PATENT DOCUMENTS

| | | | |
|---|---|---|---|
| EP | 2314855 | B1 | 4/2013 |
| FR | 1379867 | A | 11/1964 |
| GB | 700853 | A | 12/1953 |
| GB | 949442 | A | 2/1964 |

* cited by examiner

SEAT FOR GATE VALVE

CROSS-REFERENCE TO RELATED APPLICATIONS

This application is a divisional application of and claims priority under 35 U.S.C. § 121 to U.S. patent application Ser. No. 18/202,119 titled "Seat For Gate Valve" and filed on May 25, 2023, which claims priority under 35 U.S.C. § 119 to U.S. Provisional Patent Application Ser. No. 63/458,604, titled "Seat For Gate Valve" and filed on Apr. 11, 2023. The entire contents of these applications are hereby incorporated herein by reference.

TECHNICAL FIELD

The present application is related to gate valves and, more particularly, to seats for gate valves.

BACKGROUND

Some gate valves are designed for full differential with the gate using solid seats. These valves often use one or more seals to create contact pressure between the seat and the gate of the gate valve. Such seal designs in the current art, however, tend to fail at the relatively low pressures (i.e., when a fluid in the bore of the gate valve is at a relatively low pressure) because the contact pressure interface is limited in light of the full differential requirements. In some cases, industry standards require 10% of rated working pressure (RWP) as an acceptable low pressure limit. In real world conditions, most of the in-service time of a gate valve is under low pressure conditions, and so the design of gate valves in the current art leads to high rates of failure.

SUMMARY

In general, in one aspect, the disclosure relates to a gate valve that includes a valve body and a bore positioned within the valve body, where the bore traverses a width of the valve body and comprises an inlet and an outlet. The gate valve may also include a gate slidably disposed within the bore between the inlet and the outlet, where the gate, when in a first position within the bore, is configured to allow a fluid to flow within the bore from the inlet to the outlet, and where the gate, when in a second position within the bore, is configured to prevent a fluid from flowing therethrough from the inlet to the outlet. The gate valve may further include a seat disposed around the bore and adjacent to the gate and the valve body, where the seat includes a first piece and a second piece, where the first piece includes a first seat body having a first inner surface and a first outer surface, where the second piece includes a second seat body having a spring system, a second inner surface, and a second outer surface, where the second inner surface is adjacent to the gate, where the first outer surface is adjacent to the valve body, where the first inner surface and the second outer surface are adjacent to each other, where the spring system includes a cavity disposed between the first inner surface and the second outer surface and a spring section positioned between the cavity and the second inner surface, where the spring section protrudes outward relative to the second inner surface, and where the spring section is configured to move inward and reduce a volume of the cavity when the gate contacts the spring section.

In another aspect, the disclosure relates to a seat for a gate valve, where the seat includes a first piece includes a first seat body having a first inner surface and a second outer surface, wherein the first outer surface is configured to be adjacent to a valve body. The seat may also include a second piece having a second seat body having a second inner surface and a second outer surface, where the second inner surface is configured to be adjacent to a gate, and where the first inner surface and the second outer surface are configured to be adjacent to each other. The seat may further include a spring system having a cavity and a spring section. The cavity of the spring system may be disposed between the first inner surface and the second outer surface. The spring section of the spring system may be positioned between the cavity and the second inner surface, where the spring section includes a protrusion that is tapered toward a bottom end of the second seat body, where the protrusion protrudes outward relative to the second inner surface, where the spring section is configured to move inward and reduce a volume of the cavity when the gate contacts the protrusion, and where the spring section is configured to revert to its default position, thereby allowing the volume of the cavity to be restored, when the gate no longer contacts the protrusion.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, the same reference numerals used in different figures may designate like or corresponding but not necessarily identical elements.

DESCRIPTION OF THE INVENTION

Figure 1:
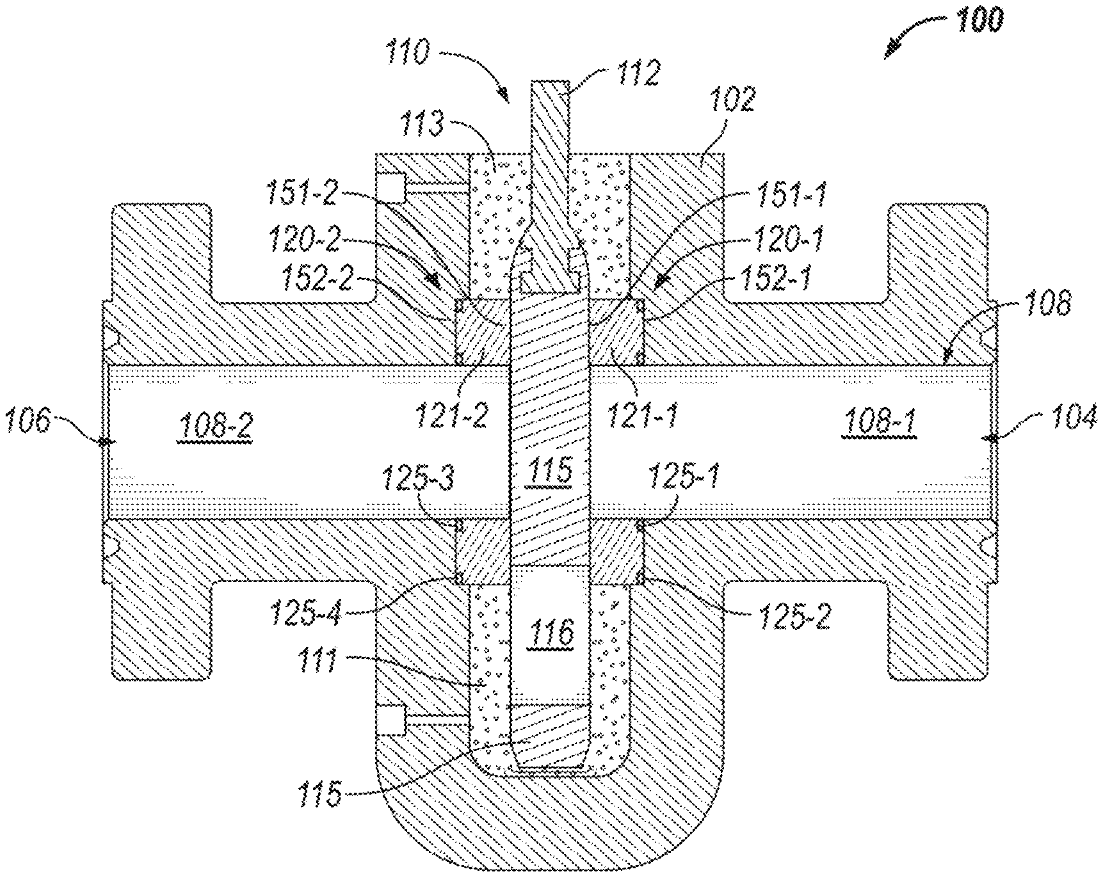
FIG. 1 shows a sectional view of a gate valve with which example embodiments may be used.

The example embodiments discussed herein are directed to systems, apparatus, methods, and devices for seats for gate valves. Gate valves with example seats can be used in any of a number of industries, including but not limited to oil and gas, petrochemical, marine, power generation, petroleum refining, wastewater, automotive, pharmaceutical, and mechanical construction. Gate valves with example seats may be designed to comply with certain standards and/or requirements.

Gate valves with example seats may be used in any of a number of different environments, including but not limited to indoors, outdoors, a manufacturing plant, a warehouse, and a storage facility, any of which can be climate-controlled or non-climate-controlled. In some cases, gate valves with the example seats discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

The use of the terms "about", "approximately", and similar terms applies to all numeric values, whether or not explicitly indicated. These terms generally refer to a range of numbers that one of ordinary skill in the art would consider as a reasonable amount of deviation to the recited numeric values (i.e., having the equivalent function or result). For example, this term may be construed as including a deviation of +10 percent of the given numeric value provided such a deviation does not alter the end function or result of the value. Therefore, a value of about 1% may be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

A user may be any person that interacts with gate valves, regardless of the environment in which the gate valve is located and/or the industry in which the gate valve is used. Examples of a user may include, but are not limited to, an engineer, an electrician, an instrumentation and controls technician, a mechanic, an operator, an employee, a consultant, a contractor, and a manufacturer's representative.

Gate valves with example seats (including portions thereof) can be made of one or more of a number of suitable materials to allow the gate valves to meet certain standards and/or regulations while also maintaining durability in light of the one or more conditions under which the gate valves and/or other associated components of the gate valves can be exposed. Examples of such materials can include, but are not limited to, aluminum, stainless steel, fiberglass, glass, plastic, thermoplastic, ceramic, and rubber.

When used in certain systems (e.g., for certain subsea field operations), gate valves with example seats can be designed to comply with certain standards and/or requirements. Examples of entities that set such standards and/or requirements can include, but are not limited to, the Society of Petroleum Engineers, the American Petroleum Institute (API), the International Standards Organization (ISO), the International Association of Classification Societies (IACS), and the Occupational Safety and Health Administration (OSHA). For example, a gate valve with example seats can comply with API 6A standards.

Example seats, or portions or components thereof, described herein can be made from a single piece (e.g., as from a mold, injection mold, casting, die cast, forging, extrusion process, or 3D printing). In addition, or in the alternative, example access seats (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example seat to become coupled, directly or indirectly, to one or more other components of the seat and/or to some other component of a gate valve. A coupling feature can include, but is not limited to, a clamp, a portion of a hinge, an aperture, a recessed area, a protrusion, a hole, a slot, a tab, a detent, and mating threads. One portion of an example seat can be coupled to another component of the seat and/or to some other component of a gate valve the direct use of one or more coupling features.

In addition, or in the alternative, a portion of an example seat can be coupled to another component of the seat and/or to another component of a gate valve using one or more independent devices that interact with one or more coupling features disposed on a component of the example seat. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

If a component of a figure is described but not expressly shown or labeled in that figure, the label used for a corresponding component in another figure may be inferred to that component. Conversely, if a component in a figure is labeled but is not described, the description for such component may be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of seats for gate valves will be described more fully hereinafter with reference to the accompanying drawings, in which example embodiments of seats for gate valves are shown. Seats for gate valves may, however, be embodied in many different forms and should not be construed as limited to the example embodiments set forth herein. Rather, these example embodiments are provided so that this disclosure will be thorough and complete, and will fully convey the scope of seats for gate valves to those of ordinary skill in the art. Like, but not necessarily the same, elements (also sometimes called components) in the various figures are denoted by like reference numerals for consistency.

Terms such as "first", "second", "primary," "secondary," "above", "below", "inner", "outer", "distal", "proximal", "end", "top", "bottom", "upper", "lower", "side", "width,", "height", "depth", "length", "left", "right", "front", "rear", and "within", when present, are used merely to distinguish one component (or part of a component or state of a component or orientation of a component) from another. This list of terms is not exclusive. Such terms are not meant to denote a preference or a particular orientation, and they are not meant to limit embodiments of seats for gate valves. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a sectional view of a gate valve 100 with which example embodiments may be used. The gate valve 100 in this example includes a valve body 102, a bore 108, a valve trim 110, and one or more seats 120. The valve body 102 of the gate valve 100 can have any of a number of configurations (e.g., shape, size, thickness) suitable for the particular use, environment, and/or industry for the gate valve 100. The valve body 102 can form a proximal receiving area 113 and a distal receiving area 111 for the gate 115 and/or other parts of the valve trim 110. The proximal receiving area 113 can be filled with one or more fluids (e.g., water, air, oil). Similarly, the distal receiving area 111 can be filled with one or more fluids (e.g., water, air, oil), which can be the same as or different than the one or more fluids within the proximal receiving area 113.

The proximal receiving area 113 can be configured to receive one or more components (including portions thereof) of the valve trim 110. Examples of components of the valve trim 110 that are received by the proximal receiving area 113 can include, but are not limited to, the actuator (e.g., a handle, a piston, a hydraulic assembly), the stem 112, and the gate 115. The actuator of the valve trim 110 can be operated manually, hydraulically, electrically, and/or by some other means. The proximal receiving area 113 can also be configured to receive, or be adjacent to, a portion (e.g., the top portion) of one or more of the seats 120. In this case, the top portions of seat 120-1 and seat 120-2 bound part of the bottom of the proximal receiving area 113.

The components (or portions thereof) of the valve trim 110 that are within the proximal receiving area 113 of the gate valve 100 can vary based on the position of the gate valve 100. For example, when the gate valve 100 is in the open position, less of the stem 112 and more of the gate 115 are positioned within the proximal receiving area 113. As another example, when the gate valve 100 is in the closed position, as shown in FIG. 1, more of the stem 112 and less of the gate 115 are positioned within the proximal receiving area 113.

The proximal receiving area 113 can be sealed (e.g., using gaskets, caulk, O-rings, and/or other sealing members and/or devices) so that elements (e.g., fluids, dirt) from outside the gate valve 100 are prevented from entering the proximal receiving area 113. The dimensions (e.g., the height, the width, the cross-sectional shape when viewed from above) of the proximal receiving area 113 can be configured in such a way that the full range of motion (between fully open and fully closed) of the gate 115 can freely occur without being obstructed within the proximal receiving area 113.

The distal receiving area 111 can be configured to receive one or more components (including portions thereof) of the valve trim 110. Examples of components of the valve trim 110 that are received by the distal receiving area 111 can include, but are not limited to, the gate 115. The distal receiving area 111 can also be configured to receive, or be adjacent to, a portion (e.g., the bottom portion) of one or more of the seats 120. In this case, the bottom portions of seat 120-1 and seat 120-2 bound part of the top of the distal receiving area 111.

The components (or portions thereof) of the valve trim 110 that are within the distal receiving area 111 of the gate valve 100 can vary based on the position of the gate valve 100. For example, when the gate valve 100 is in the open position, only the distal end (below the hole) of the gate 115 is positioned within the distal receiving area 111. As another example, when the gate valve 100 is in the closed position, as shown in FIG. 1, all of the distal end of the gate 115 and all of the hole 116 in the gate 115 are positioned within the distal receiving area 111.

The distal receiving area 111 can be sealed (e.g., using gaskets, caulk, O-rings, and/or other sealing members and/or devices) so that elements (e.g., fluids, dirt) from outside the gate valve 100 are prevented from entering the distal receiving area 111. The dimensions (e.g., the height, the width, the cross-sectional shape when viewed from above) of the distal receiving area 111 can be configured in such a way that the full range of motion (between fully open and fully closed) of the gate 115 can freely occur without being obstructed within the distal receiving area 111.

The bore 108 of the gate valve 100 is positioned within the valve body 102. In this case, the bore 108 traverses a width of the valve body 102. The bore 108 of the gate valve 100 includes an inlet 104 that is part of an upstream bore portion 108-1 of the bore 108 and an outlet 106 that is part of a downstream bore portion 108-2 of the bore 108. The bore 108 can be cylindrical (have a circular cross-sectional shape) along its entire length. Alternatively, the bore 108 can have one or more of a number of other cross-sectional shapes along some or all of its length. The cross-sectional area of the bore 108 can be substantially constant along its length or differ at one or more points along its length.

Dividing the bore 108 into the upstream bore portion 108-1 and the downstream bore portion 108-2 is the gate 115. As discussed above, the gate 115 has a hole 116 that traverses the thickness of the gate 115. The hole 116 can have the same characteristics (e.g., shape, width, height, cross-sectional area) as the distal end (adjacent to the gate 115) of the upstream bore portion 108-1 and the proximal end (adjacent to the gate 115) of the downstream bore portion 108-2. When the gate valve 100 is in the open position (i.e., a fully open position), the center of the hole 116 in the gate 115 is substantially aligned with the axial centers of the upstream bore portion 108-1 and the downstream bore portion 108-2. When the gate valve 100 is in the closed position (i.e., a fully closed position), the gate 115 completely covers the upstream bore portion 108-1 and the downstream bore portion 108-2, and no part of the hole 116 in the gate 115 intersects the upstream bore portion 108-1 or the downstream bore portion 108-2 of the bore 108.

For the gate valve 100 to transition between the closed position and the open position, the gate 115 is slidably (or otherwise movably) disposed within the bore 108 between the inlet 104 (the upstream bore portion 108-1) and the outlet 106 (the downstream bore portion 108-2). When the gate valve 100 is open (when the gate 115 is in a position within the bore 108 that aligns the hole 116 with the bore 108), fluid can be allowed to flow within the bore 108 from the inlet 104 to the outlet 106. When the gate valve 100 is closed (when the gate is in a position within the bore 108 that completely blocks the bore 108 with the gate 115), fluid is prevented from flowing through to gate 115 within the bore 108 from the inlet 104 to the outlet 106.

In this case, the gate valve 100 has two seats 120 that are located on either side of the gate 115. The seat 120-1 is cylindrically shaped in this case, with FIG. 1 showing a sectional side view of the seat 120-1. The seat 120-1 is positioned around the upstream bore portion 108-1 of the bore 108 and adjacent to (between) the gate 115 and the valve body 102. The seat 120-1 includes a seat body 121-1 having an inner surface 151-1 and an outer surface 152-1, where the inner surface 151-1 is adjacent to the gate 115, and where the outer surface 152-1 is adjacent to the valve body 102. The seat 120-1 can include one or more features to ensure a sufficient seal between the gate 115 and/or the valve body 102 to ensure that no fluids and/or other contaminants can pass therebetween. For example, along the outer surface 152-1 of the seat 120-1 are two sealing members 125 that make contact with the valve body 102. Sealing member 125-1 is positioned close to the inner perimeter of the seat body 121-1, and sealing member 125-2 is positioned close to the outer perimeter of the seat body 121-1.

In this case, the inner surface 151-1 of the seat body 121-1 has no features. In the current art, the seat body 121-1 is made of metal. As such, the inner surface 151-1 of the seat body 121-1 forms a metal-to-metal seal with the gate 115. Both the inner surface 151-1 of the seat body 121-1 and the adjacent surface of the valve body 102 can be smooth, planar, and highly polished in order to provide a more effective metal-to-metal seal. When the gate valve 100 has multiple seats 120, the characteristics (e.g., shape, size, material, types of sealing members, location of sealing members) of one seat 120 can be the same as, or different than, the corresponding characteristics of one or more of the other seats 120.

Seat 120-2 is cylindrically shaped in this case, with FIG. 1 showing a sectional side view of the seat 120-2. The seat 120-2 is positioned around the downstream bore portion 108-2 of the bore 108 and adjacent to (between) the gate 115 and the valve body 102. The seat 120-2 includes a seat body 121-2 having an inner surface 151-2 and an outer surface 152-2, where the inner surface 151-2 is adjacent to the gate 115, and where the outer surface 152-2 is adjacent to the valve body 102. The seat 120-2 can include one or more features to ensure a sufficient seal between the gate 115 and/or the valve body 102 to ensure that no fluids and/or other contaminants can pass therebetween. For example, along the outer surface 152-2 of the seat 120-2 are two sealing members 125 that make contact with the valve body

102. Sealing member 125-3 is positioned close to the inner perimeter of the seat body 121-2, and sealing member 125-4 is positioned close to the outer perimeter of the seat body 121-2.

In this case, the inner surface 151-2 of the seat body 121-2 has no features. In the current art, the seat body 121-2 is made of metal. As such, the inner surface 151-2 of the seat body 121-2 forms a metal-to-metal seal with the gate 115. Both the inner surface 151-2 of the seat body 121-2 and the adjacent surface of the valve body 102 can be smooth, planar, and highly polished in order to provide a more effective metal-to-metal seal.

The sealing members 125 of the seats 120 can have any of a number of features, components, and/or configurations to allow the sealing members 125 to provide a solid seal with the valve body 102. For example, a sealing member 125 can be or include an elastomeric gasket with one or more small springs inside the gasket. For example, a sealing member 125 can be or include a pressure-energized lip seal with a spring (sometimes called a lip spring). As another example, a sealing member 125 can be or include a pressure-energized elastomer. When a seat 120 has multiple sealing members 125, the characteristics (e.g., shape, size, material, orientation, configuration) of one sealing member 125 can be the same as, or different than, one or more of the corresponding characteristics of one or more of the other sealing members 125.

The contact seal between a seat 120-2 and gate 115 as well as the seat 120 and the valve body 102 on the downstream side can be designed for full differential pressure between upstream and downstream of the gate 115. In such cases, if there is too much metal-to-metal contact area and the pressure is not high enough, the seal between the seat 120-2 and the gate 115 is not sufficient (i.e., there is not enough force to sustain the seal through the metal-to-metal contact). Also, in such cases, if there is too low of a metal-to-metal contact area between the seat 120-2 and the gate 115 and the pressure is too high, cracks and other mechanical failures can result. It is not feasible to increase the size of the spring in the sealing members 125 because the contact area between the seat 120-2 and the gate 115 is too large and it is not possible to have a spring that creates a high enough force in light of factors like the size of the pocket space and movement of the gate 115. Example embodiments incorporate a seal design into the inner surface 151-2 (also called the face) of the seat 120-2.

Figure 2:
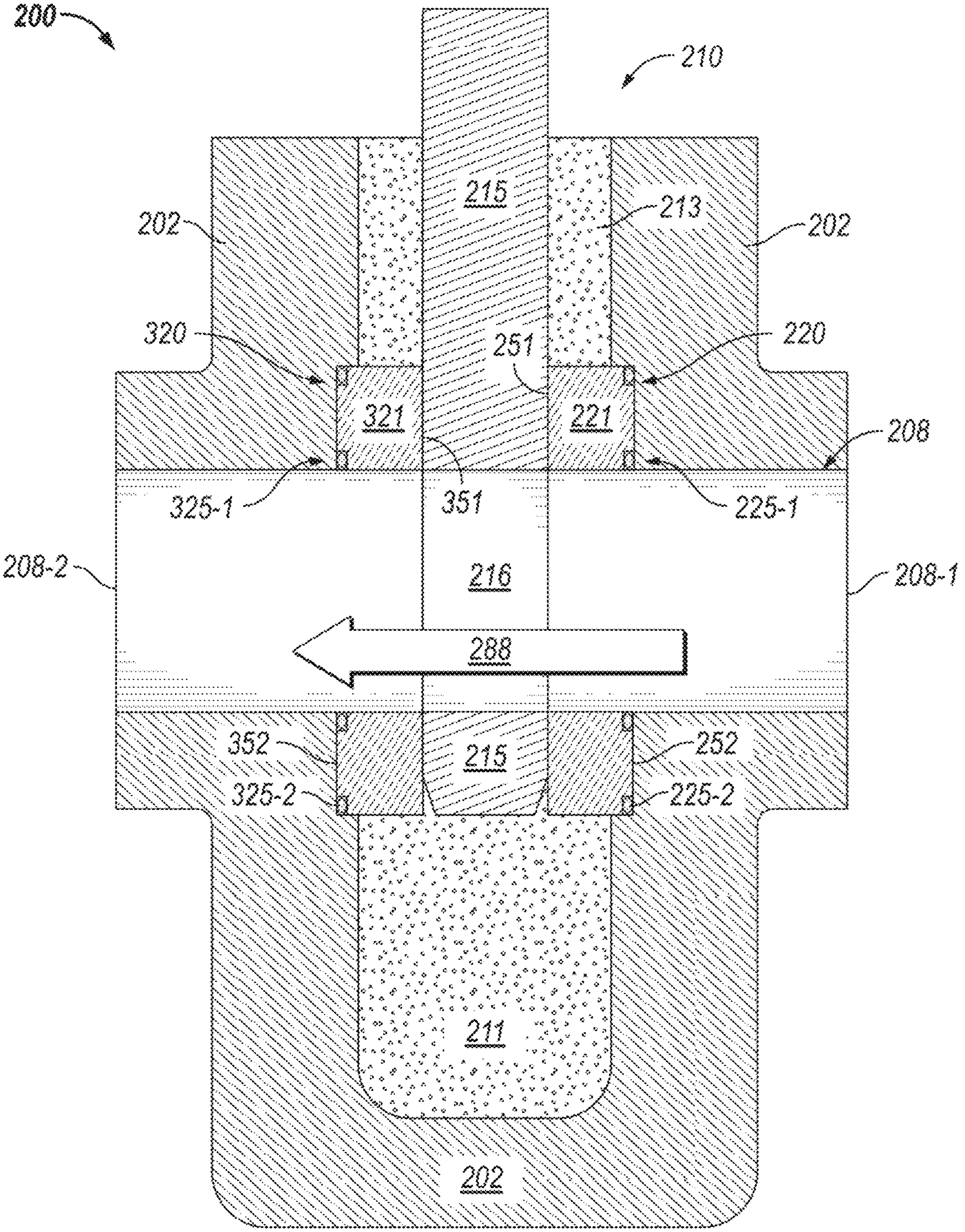
FIG. 2 shows a sectional view of part of a gate valve with the gate in the open position for use with certain example embodiments.

FIG. 2 shows a sectional view of part of a gate valve 200 with the gate 215 in the open position for use with certain example embodiments. The gate valve 200 includes a valve body 202, a bore 208, a valve trim 210, and two seats (seat 220 and seat 320). These components of the gate valve 200, including portions thereof, can be substantially the same as the valve body 102, the bore 108, the valve trim 110, and the seats 120 (including corresponding portions thereof) discussed above with respect to FIG. 1. For example, the valve body 202 can form a proximal receiving area 213 and a distal receiving area 211 for the gate 215 and/or other parts of the valve trim 210. The proximal receiving area 213 can be filled with one or more fluids (e.g., water, air, oil). Similarly, the distal receiving area 211 can be filled with one or more fluids (e.g., water, air, oil), which can be the same as or different than the one or more fluids within the proximal receiving area 213.

Figure 3:
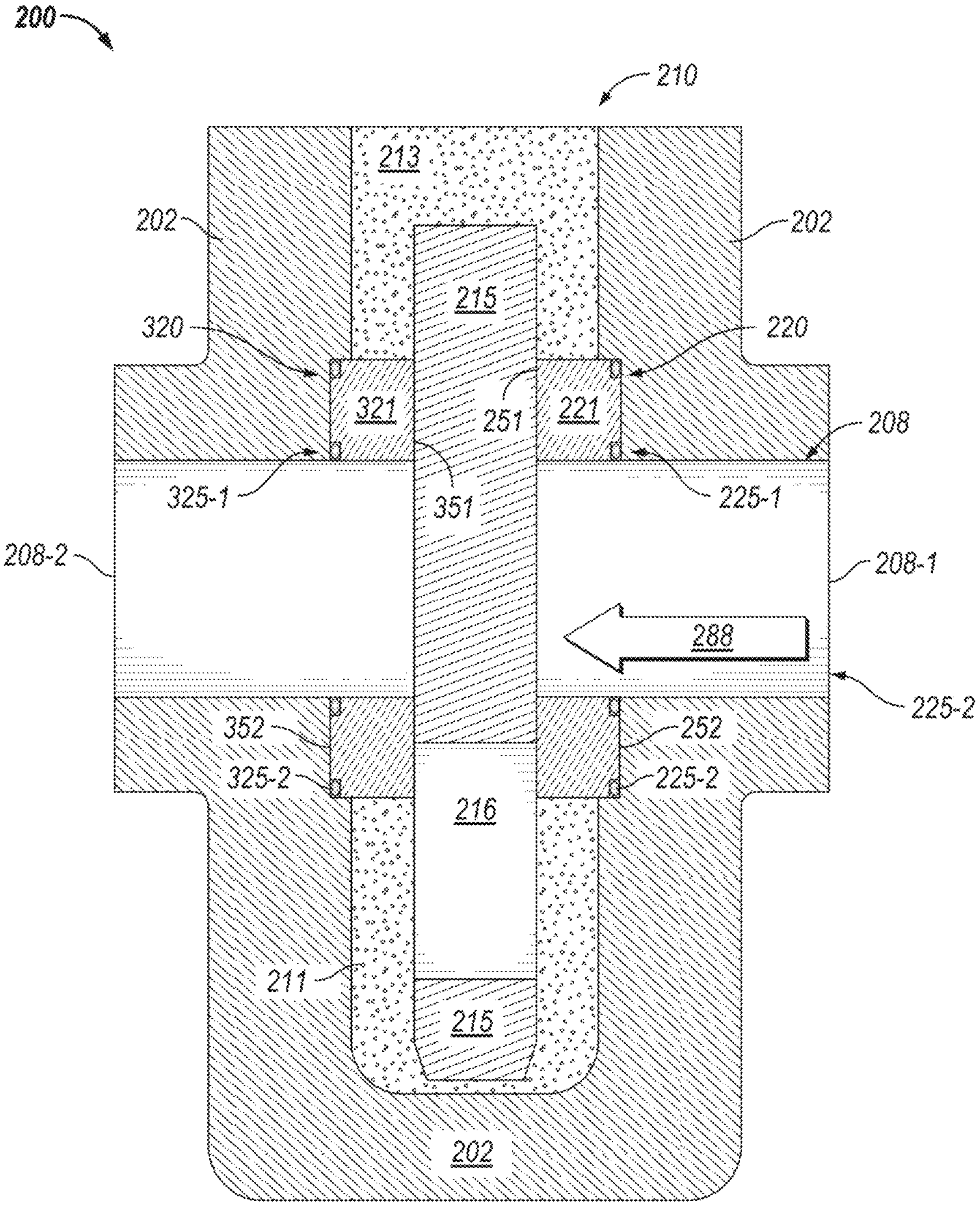
FIG. 3 shows a sectional view of part of the gate valve of FIG. 2 with the gate in the closed position for use with certain example embodiments.

In this case, only the gate 215 with the hole 216 of the valve trim 210 is shown in FIGS. 2 and 3. The proximal receiving area 213 can also be configured to receive, or be adjacent to, a portion (e.g., the top portion) of one or more of the seats 220. In this case, the top portions of the seat 220 and the seat 320 bound part of the bottom of the proximal receiving area 213. Similarly, the bottom portions of the seat 220 and the seat 320 bound part of the top of the distal receiving area 211.

When the gate 215 is in the open position, the hole 216 in the gate 215 is aligned with the bore 208, thereby allowing a fluid 288 to flow from the upstream bore portion 208-1 of the bore 208, through the hole 216 in the gate 215, and through the downstream bore portion 208-2 of the bore 208. Under this operating condition, the pressure is uniform throughout the bore 208 (absent a blockage from some external source), and so there is no pressure differential between the upstream bore portion 208-1 and the downstream bore portion 208-2. Also, since the gate 215 is not directly exposed to the fluid 288 flowing through the bore 208 when the gate valve 200 is open, the gate 215 does not apply any lateral pressure to the seat 220 or the seat 320. When the gate valve 200 is open, the gate 215 makes full contact with most, but not all, of the inner surface 251 of the seat 220 and with most, but not all, of the inner surface 351 of the seat 320.

Seat 220 and seat 320 are located on either side of the gate 215. The seat 220 and the seat 320 in this case are configured substantially identically to each other. For example, the seat 220 and the seat 320 are each cylindrically shaped in this case, with FIG. 2 showing a sectional side view of them. The seat 220 is positioned around the upstream bore portion 208-1 of the bore 208 and adjacent to (between) the gate 215 and the valve body 202. The seat 220 includes a seat body 221 having an inner surface 251 and an outer surface 252, where the inner surface 251 is adjacent to the gate 215, and where the outer surface 252 is adjacent to the valve body 202. Along the outer surface 252 of the seat 220 are two sealing members 225 that make contact with the valve body 202. Sealing member 225-1 is positioned close to the inner perimeter of the seat body 221, and sealing member 225-2 is positioned close to the outer perimeter of the seat body 221. The inner surface 251 of the seat body 221 and the surface of the adjacent wall of the valve body 202 have no features.

Similarly, the seat 320 is positioned around the downstream bore portion 208-2 of the bore 208 and adjacent to (between) the gate 215 and the valve body 202. The seat 320 includes a seat body 321 having an inner surface 351 and an outer surface 352, where the inner surface 351 is adjacent to the gate 215, and where the outer surface 352 is adjacent to the valve body 202. Along the outer surface 352 of the seat 320 are two sealing members 325 that make contact with the valve body 202. Sealing member 325-1 is positioned close to the inner perimeter of the seat body 321, and sealing member 325-2 is positioned close to the outer perimeter of the seat body 321. The inner surface 351 of the seat body 321 and the surface of the adjacent wall of the valve body 202 have no features.

FIG. 3 shows a sectional view of the part of the gate valve 200 of FIG. 2 with the gate 215 in the closed position for use with certain example embodiments. When the gate valve 200 is fully closed, the gate 215 is moved downward further into the distal receiving area 211 until the hole 216 in the gate is disposed entirely in the distal receiving area 211 and has not intersection with the bore 208. The part of the gate 215 above the hole 216 completely covers the bore 208, and also makes full contact with all of the inner surface 251 of the seat 220 and with all of the inner surface 351 of the seat 320.

By completely blocking the bore 208 between the upstream bore portion 208-1 and the downstream bore portion 208-2, and by making full face-to-face contact with all of the inner surface 251 of the seat 220 and with all of the inner surface 351 of the seat 320, the gate 215 stops flow of the fluid 288 from the upstream bore portion 208-1 to the downstream bore portion 208-2. This generates a pressure differential across the gate 215 so that the pressure within the upstream bore portion 208-1 is higher than the pressure within the downstream bore portion 208-2. In addition, the force of the fluid 288 against the gate 215 within the upstream bore portion 208-1 can increase the force between the gate 215 and the inner surface 351 of the seat 320 while also decreasing the force between the gate 215 and the inner surface 251 of the seat 220.

In such cases, the sealing members 225 of the seat 220 and the sealing members 325 of the seat 320 can compensate and help to keep the fluid 288 from escaping from the upstream bore portion 208-1 within the gate valve 200. As discussed above, designs of sealing members 225 and/or sealing members 325 can incorporate a seal on the seat pocket side and a spring. The spring can either be incorporated into the seal or separate. The spring can provide some force to create contact pressure between the seat (e.g., seat 220, seat 320) and the gate 215 for low pressure performance. However, this type of design struggles at low pressure (e.g., less than 10% of RWP) as the contact pressure interface is limited based on full differential requirements.

If the contact area between the gate 215 and the inner surface 351 of the seat 320 and/or the inner surface 251 of the seat 220 is too small, the sealing members (e.g., sealing members 225, sealing members 325) yield during high pressure (e.g., above 10% of RWP). The large contact area between the gate 215 and the inner surface 351 of the seat 320 and/or the inner surface 251 of the seat 220 requires more spring to get the contact pressure to seal at low pressure. However, using such a large spring makes the torque and installation load too high. The industry standard API 6A for gate valves requires 10% of RWP as an acceptable low-pressure limit. This means a gate valve rated at 15000 psi often fails below 1500 psi. Real world conditions for field operations in many cases is low pressure (e.g., less than 10% of RWP) for the majority of the life a gate valve, with high pressure being only in contingency that occurs in relatively rare circumstances. In other words, gate valves operating at low pressure is most typical the majority of the time. As a result, the design of seats of gate valves in the current art are not optimized for actual field conditions, which leads to drawbacks that include, but are not limited to, high equipment failure, high valve change out frequency, increased cost, increased risk, and increased emissions. Example seats for gate valves reduces or eliminates these problems by providing dramatically improved performance at relatively low pressure conditions.

Figure 4A:
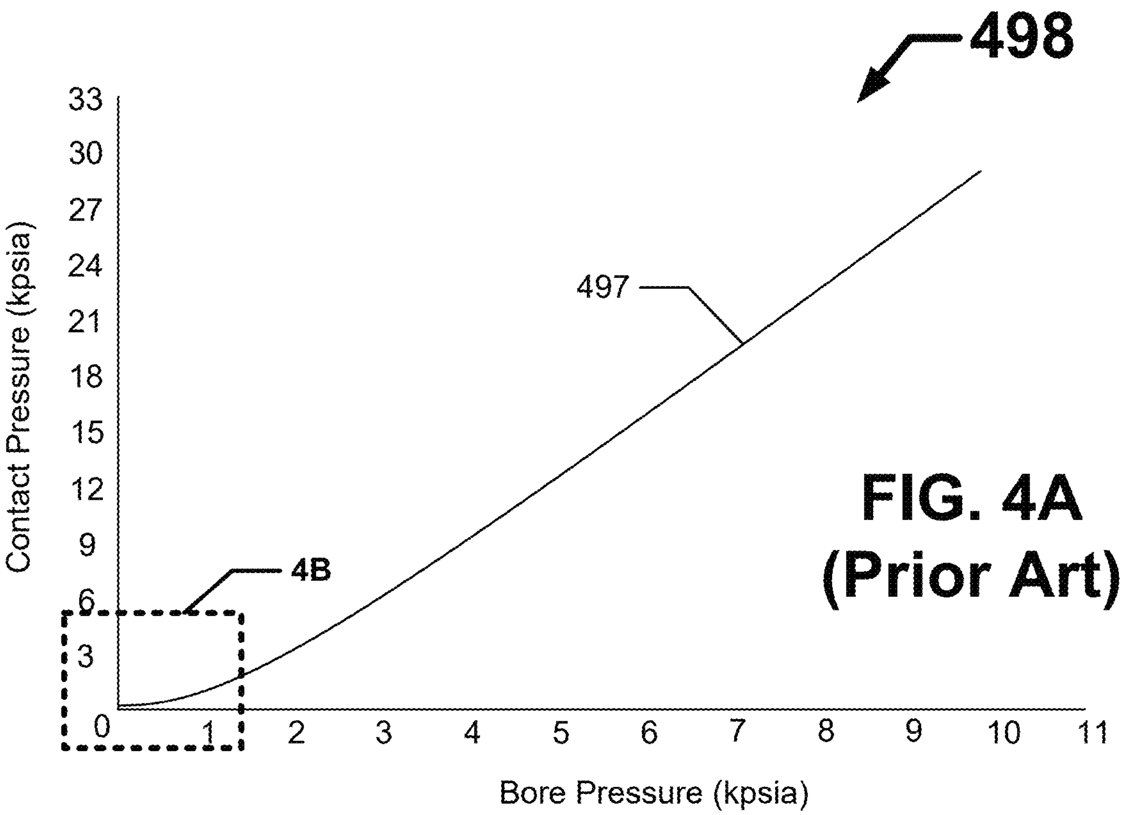
FIG. 4A (Prior Art)
FIGS. 4A and 4B are graphs that show the relationship between contact pressure and bore pressure for a gate valve according to the current art.
Figure 4B:
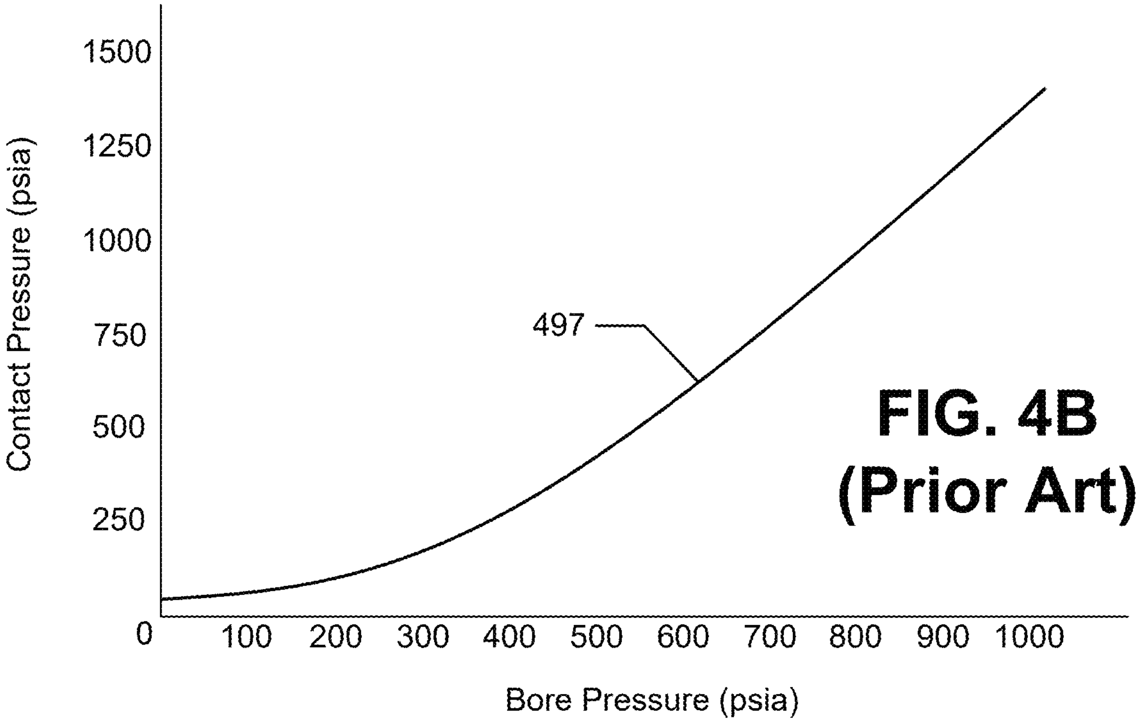
FIG. 4B (Prior Art)

FIGS. 4A and 4B are graphs that show the relationship between contact pressure and bore pressure for a gate valve according to the current art. Specifically, FIG. 4A shows a graph 498 that includes a plot 497 of contact pressure (shown on the vertical axis in kpsia) and pressure (shown on the horizontal axis in kpsia) within the bore (e.g., bore 108) of a gate valve (e.g., gate valve 100). FIG. 4B shows a detailed view of the plot 497 of the graph 498 of FIG. 4A for bore pressures below 1 kpsia. Referring to FIGS. 1 through 4B, the contact pressure in this case is between the inner surface (e.g., inner surface 151-2) of a seat (e.g., seat 120-2) and the adjacent wall of the valve body (e.g., valve body 102). Also, the bore pressure is the differential pressure between the upstream bore portion (e.g., upstream bore portion 208-1) and the downstream bore portion (e.g., downstream bore portion 208-2).

The plot 497 of the graph 498 shows that the relationship between contact pressure and bore pressure is substantially linear when the bore pressure is above approximately 1000 psia. As shown by the detail graph in FIG. 4B, the plot 497 loses its linearity when the bore pressure is below approximately 1000 psia. If the gate valve in this example has a RWP of 10 kpsia, the plot 497 indicates that the gate valve can have performance problems when the bore pressure is at or less than 10% of the RWP. Specifically, at relatively lower bore pressures, the contact pressure needs to be multiples greater than the bore pressure to avoid failure of the gate valve. This reiterates the point made above that the design currently used in the art in terms of the interaction between the seat and the valve wall at relatively low pressure conditions leads to frequent problems.

Figure 5A:
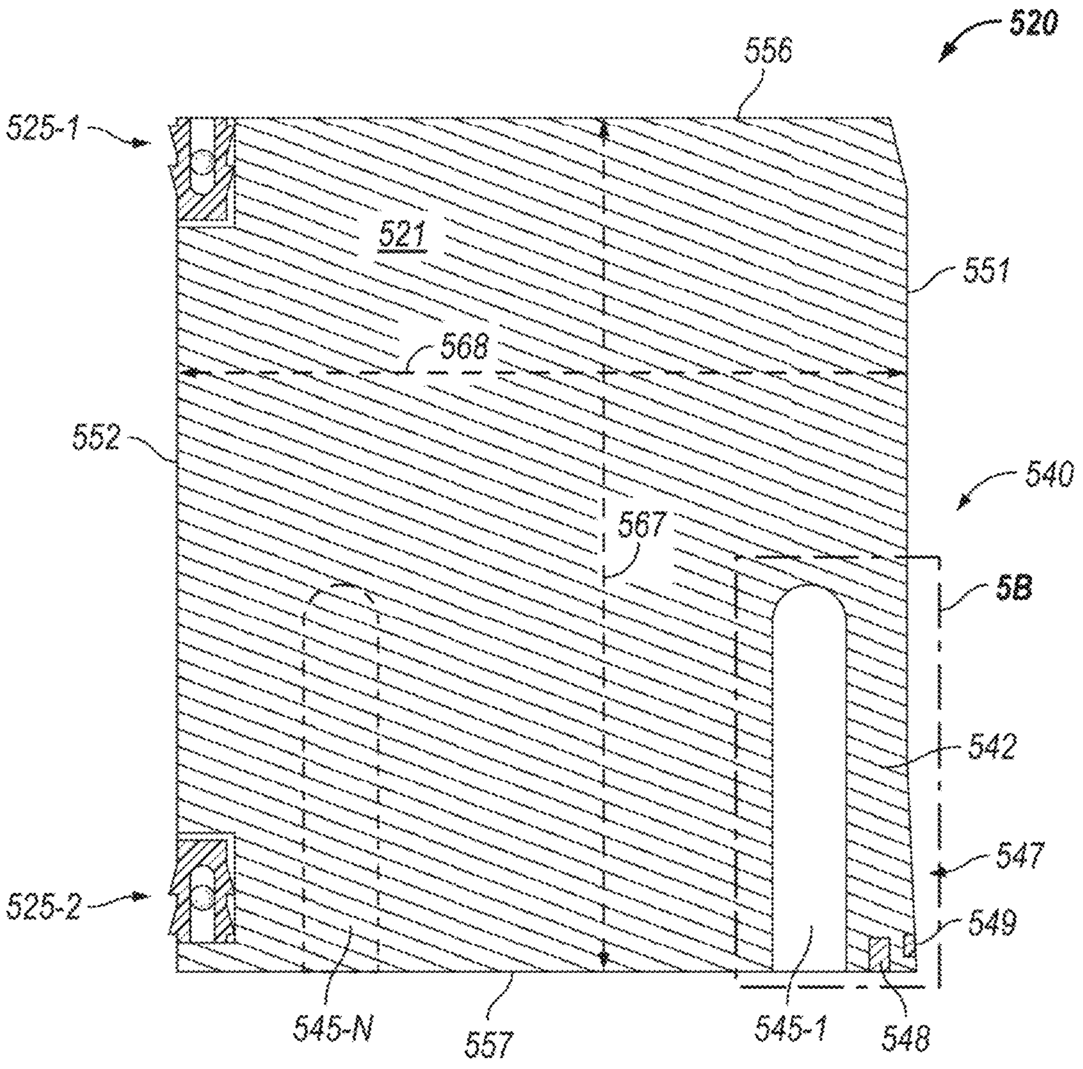
FIGS. 5A and 5B show an example of a seat for a gate valve according to certain example embodiments.
Figure 5B:
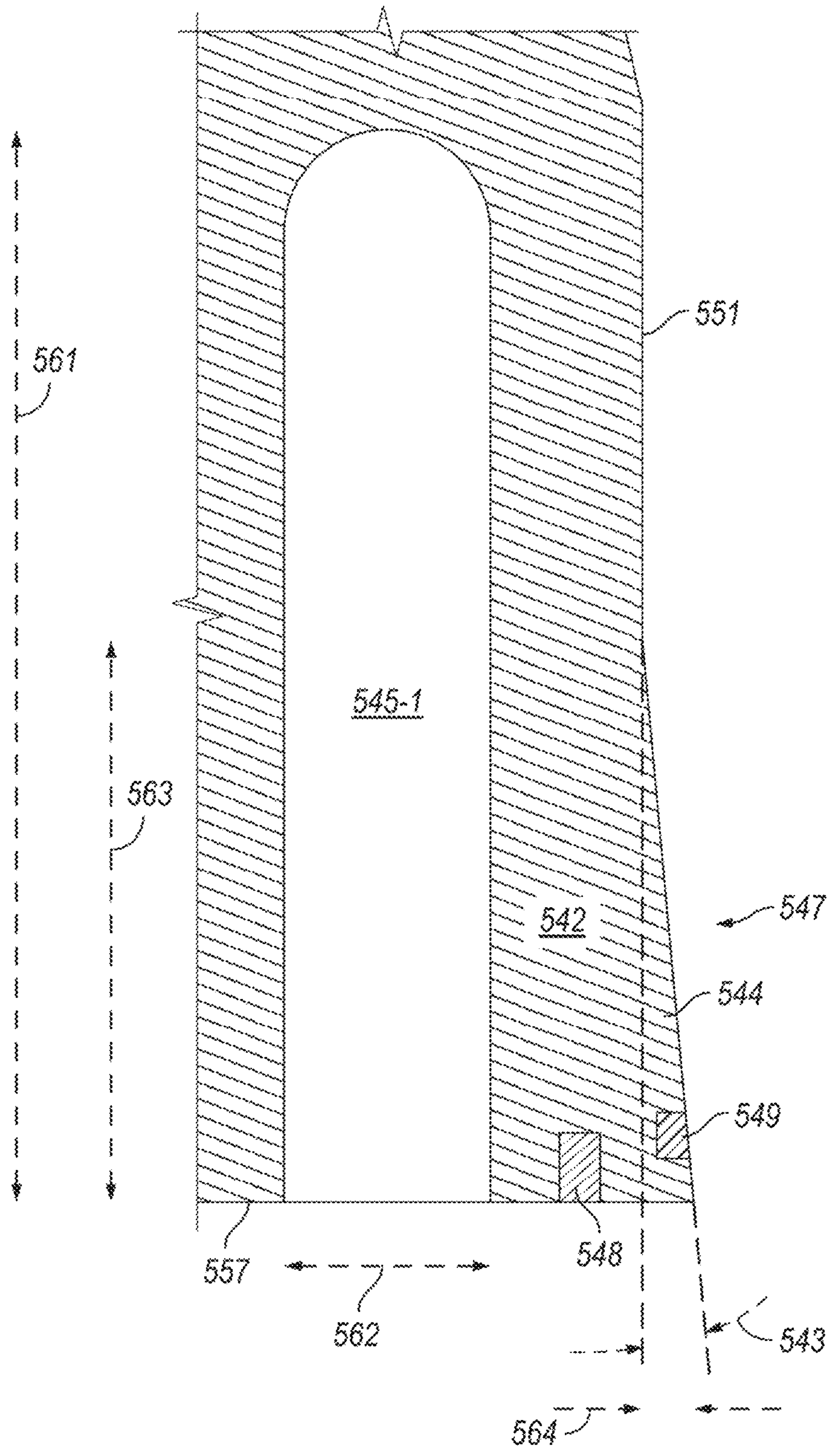
Figure 6:
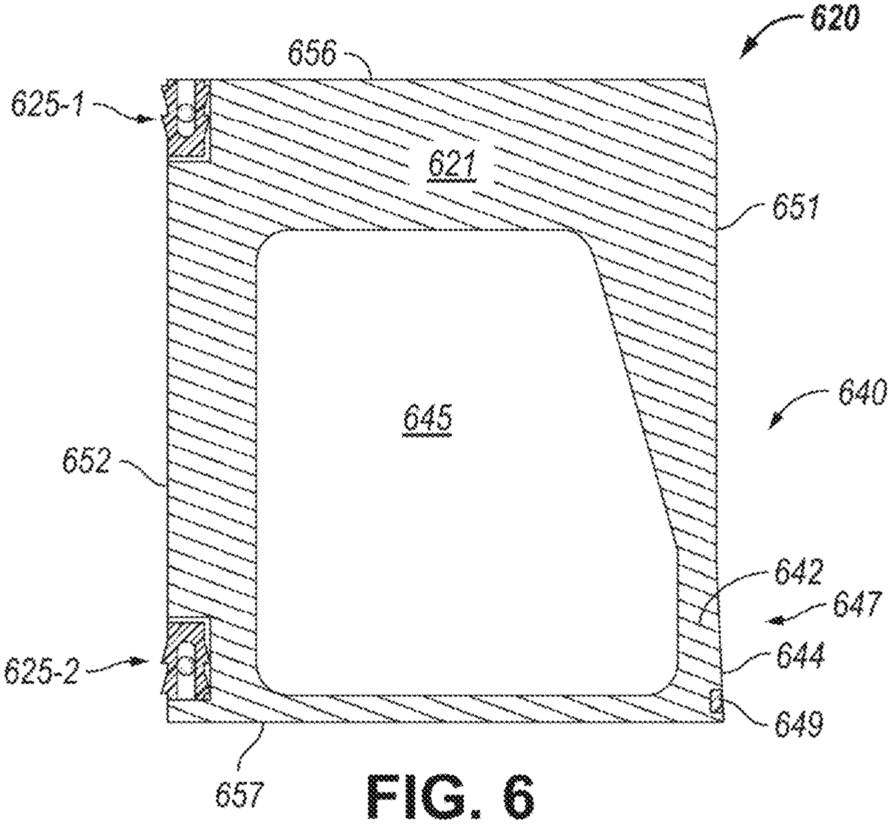
FIG. 6 shows another example of a seat for a gate valve according to certain example embodiments.
Figure 7:
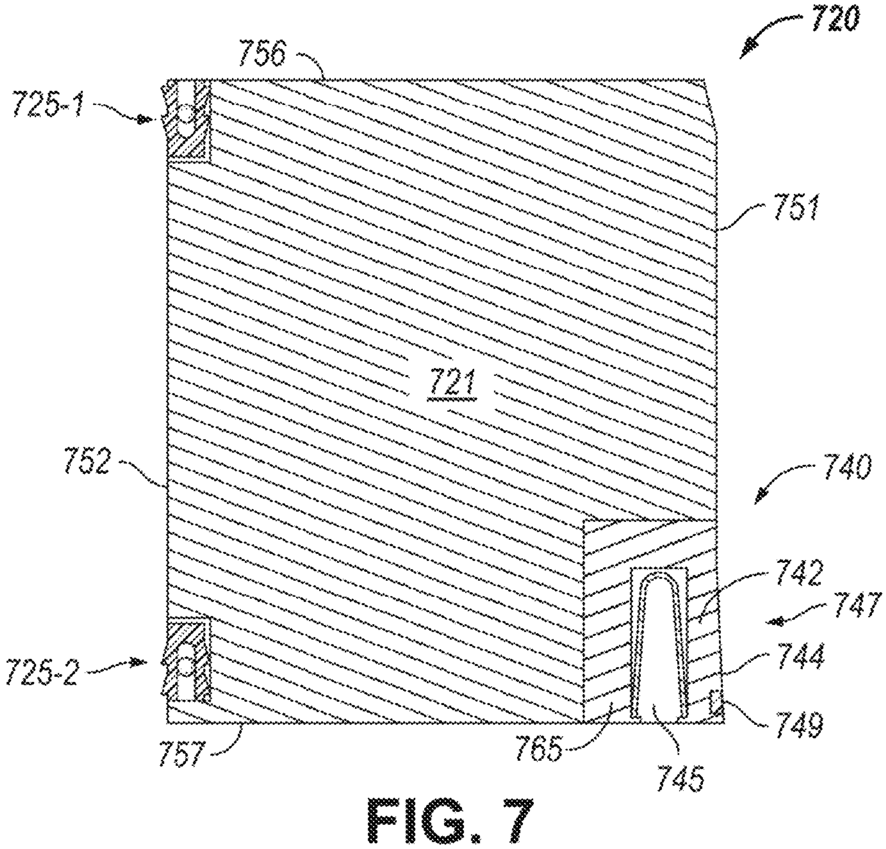
FIG. 7 shows yet another example of a seat for a gate valve according to certain example embodiments.

FIGS. 5A through 13 shows various embodiments of an example seat according to certain example embodiments. Specifically, FIGS. 5A and 5B show a sectional side view and a detailed view, respectively, of an example of a seat 520 for a gate valve according to certain example embodiments. FIG. 6 shows a sectional side view of another example of a seat 620 for a gate valve according to certain example embodiments. FIG. 7 shows a sectional side view of yet another example of a seat 720 for a gate valve according to certain example embodiments. FIGS. 8 through 13 show front views of various example seats according to certain example embodiments.

Referring to FIGS. 1 through 13, the example seats discussed herein have multiple variations of a spring system having two general features. The first feature of the spring system is an outward protrusion (part of a spring section herein) of part of the inner surface of the seat. The protrusion can be tapered relative to the inner surface of the seat. The second feature of the spring system is a cavity within the seat body of the seat, where the cavity and the outward protrusion are positioned relatively close to each other. Under such an arrangement, the outward protrusion makes first contact with the gate of the gate valve relative to a remainder of the inner surface of the seat.

When the gate contacts the outward protrusion, the gate applies an inward force against the outward protrusion. In other words, the protrusion creates an initial interference with the gate as the gate, in a closed position, has increased pressure applied to it from the upstream side of the bore. As the differential pressure increases and the gate is pushed with more force toward the downstream side of the bore, the gate comes into more and more contact with the seat. Because the cavity within the seat body is proximate to the outward protrusion, the outward protrusion acts as a type of spring and causes the size of the cavity to shrink as the gate pushes the outward protrusion toward the outer surface of the seat. This arrangement results in a significantly higher contact pressure between the inner surface of the seat and the adjacent wall of the valve body when the core pressure is at a level (e.g., 10% of RWP) commonly found during operations.

The position of each example seat within a gate valve relative to a seat currently used in the art is unchanged. Also, the footprint (e.g., shape, size) of each example seat is substantially the same as the footprint of a seat currently used in the art. As such, example seats can be used to replace existing seats to retrofit existing gate valves without having to make any other modifications to the existing gate valves.

For example, the seat 520 of FIGS. 5A and 5B includes a seat body 521 that generally has a rectangular cross-sectional shape with a height 567 and a width (thickness) 568. Overall, the seat body 521 of the seat 520 can be cylindrical in shape. The seat body 521 has an inner surface 551 and an outer surface 552. The outer surface 552 can optionally include one or more sealing members 525, which are substantially the same as the sealing members 125, the sealing members 225, and the sealing members 325 discussed above. In this case, there are two sealing members 525, where the sealing member 525-1 is positioned toward the outer perimeter 556 of the seat body 521, and where the sealing member 525-2 is positioned toward the inner perimeter 557 of the seat body 521. The sealing members 525 are configured to interact with a wall of the valve body (e.g., valve body 202).

The seat 520 can have one or more spring systems 540. In this example, the seat 520 has a single spring system 540. As shown in FIGS. 5A and 5B, the spring system 540 includes one or more cavities 545 and a spring section 547. A cavity 545 is disposed in the seat body 521. A cavity 545 can have any of a number of characteristics (e.g., height 561, width 562, length, shape). For example, a cavity 545 can be slightly conically shaped. A cavity 545 can have an open end, as in this case where the cavity 545-1 and the cavity 545-N have an open bottom end. Alternatively, a cavity 545 can be completely enclosed within the seat body 521. When the seat 520 has multiple cavities 545, the characteristics (e.g., height, width, shape, fluid or material used as filler) of one cavity 545 can be the same as, or different than, one or more of the corresponding characteristics of one or more of the other cavities 545.

In some cases, a cavity 545 can be filled, in whole or in part, with a fluid (e.g., air) and/or some other material (e.g., an elastomeric material, a gel). In such cases, the fluid and/or other material that fills some or all of the cavity 545 can be configured to allow the shape of the cavity 545 to change when a force is applied to the spring section 547 in the direction of the outer surface 552 of the seat body 521. In some cases, a cavity 545 has a height 561 that is greater than the height of the spring section 547. A cavity 545 can be formed within the seat body 521 in any of a number of ways, including but not limited to drilling and casting.

A spring section 547 of a spring system 540 is positioned between a cavity 545 and the inner surface 551 of the seat body 521 toward the inner perimeter 557 of the seat body 521. A spring section 547 can include a base portion 542 of the seat body 521 that falls within an extension of the plane formed by the inner surface 551 of the seat body 521 and a protrusion 544 that extends outward from the plane formed by the inner surface 551 of the seat body 521. The base portion 542 (or portions thereof) and the protrusion 544 (or portions thereof) of the spring section 547 can be separate pieces that are coupled to each other (e.g., using epoxy, using independent coupling features). In addition, or in the alternative, the base portion 542 (or portions thereof) and the protrusion 544 (or portions thereof) of the spring section 547 can be integral with each other, formed from a continuous piece.

In certain example embodiments, the spring section 547 is configured to move inward (i.e., toward the cavity 545) and reduce the volume of the cavity 545 when an inward force is applied to the spring section 547. This situation can occur when a gate (e.g., gate 115, gate 215) contacts the spring section 547, regardless of whether the gate is stationary or moving to change the position (e.g., from open to closed) of the gate valve (e.g., gate valve 100, gate valve 200). In such cases, the cavity 545 of the spring system 540 is designed to provide some amount of interference along a range of core pressures, which translates to forces applied by the gate to the seat 520.

When the gate no longer contacts the spring section 547 of the spring system 540, the spring section 547 is configured to revert to its default position, thereby allowing the volume of the cavity 545 to be restored. Because the gate contacts at least a majority of the inner surface 551 of the seat 520 at all times during operation of the gate valve, the example spring system 540 is capable of being engaged at all times. When the core pressure is relatively low (e.g., less than 10% of the RWP of the gate valve), the example spring system 540 dramatically increases the contact pressure relative to the current art, as shown below with respect to FIG. 16. The spring system 540 can be designed to have a substantially fixed contact pressure up to a certain bore pressure, which is also shown below with respect to FIG. 16.

The protrusion 544 of the spring section 547 can have any of a number of characteristics (e.g., shape, length, width, height, material). For example, the protrusion 544 can be a single continuous piece that is placed over and epoxied to part of the inner surface 551 of the seat body 521. As another example, the cross-sectional shape (as shown in FIG. 5B) of the protrusion 544 can be a triangle. In alternative embodiments, the cross-sectional shape of the distal part of the protrusion 544 can be curved (e.g., concave, convex, parabolic, elliptical) and/or some other shape aside from linear. The protrusion 544 can be a segmented piece that covers only a portion of the length and width of the inner surface 551 of the seat body 521.

In this case, the outer surface of the protrusion 544 is tapered relative to the inner surface 551 of the seat 520 and creates an acute angle 543 (e.g., no greater than) 15° with the inner surface 551 of the seat body 521. In alternative embodiments, rather than being tapered, the protrusion 544 can have any of a number of other shapes (e.g., a curvature) and/or features (e.g., a textured surface). The protrusion 544 can have a vertical height 563 and a maximum width 564. The vertical height 563 of the protrusion 544 can be less than the height 561 of the adjacent cavity 545-1 of the spring system 540. The protrusion 544 can include one or more sealing members 549. In this example, a sealing member 549 is disposed in a channel along the outer surface of the protrusion 544. The sealing member 549 can be substantially the same as the sealing members 125 and the sealing members 225 discussed above.

In certain example embodiments, the spring section 547 of the spring system 540 can include one or more optional keys 548 that can be used to properly align the seat 520 within the gate valve. In such cases, the key 548 can interact with a tool or other device used by a user to properly manipulate and position the seat 520 within the gate valve. In addition, or in the alternative, the key 548 can interact with a complementary feature of another component of the gate valve. The key 548 can take on any of a number of forms, including but not limited to a notch, a detent, a protrusion, an aperture, a recess, a tab, and a slot. In some cases, a key 548 can additionally or alternatively be disposed on a different part of the seat body 521 of the seat 520.

Referring to FIG. 6, the seat 620 includes a seat body 621 having an inner surface 651, an outer surface 652, an inner perimeter 657, and an outer perimeter 656. There are two sealing members 625, where the sealing member 625-1 is positioned toward the outer perimeter 656 of the seat body 521 along the outer surface 652, and where the sealing member 625-2 is positioned toward the inner perimeter 657 along the outer surface 652 of the seat body 621. The sealing members 625 are configured to interact with a wall of the valve body (e.g., valve body 202) and are substantially similar to the sealing members discussed above.

The seat 620 also includes a spring system 640 that includes a cavity 645 and a spring section 647. The cavity 645 in this case is completely enclosed within the seat body 621. The spring section 647 includes a base portion 642 and a protrusion 644 that extends outward from the plane of the inner surface 651 in a manner similar to the configuration of the protrusion 644 of FIGS. 5A and 5B. There is also a sealing member 649, similar to the sealing member 549 discussed above, disposed in the protrusion 644 of the spring section 647.

Referring to FIG. 7, the seat 720 includes a seat body 721 having an inner surface 751, an outer surface 752, an inner perimeter 757, and an outer perimeter 756. There are two sealing members 725, where the sealing member 725-1 is positioned toward the outer perimeter 756 of the seat body 721 along the outer surface 752, and where the sealing member 725-2 is positioned toward the inner perimeter 757 along the outer surface 752 of the seat body 721. The sealing members 725 are configured to interact with a wall of the valve body (e.g., valve body 202) and are substantially similar to the sealing members discussed above.

The seat 720 also includes a spring system 740 that includes a cavity 745 and a spring section 747. In this case, the spring system 740 is a separate component that is coupled to the seat body 721. The body 765 of the spring system 740 can be made of the same or a different material compared to the material of the seat body 721. The cavity 745 in this case is disposed in the body 765 of the spring system 740 and has an open-ended bottom. The spring section 747 includes a base portion 742 and a protrusion 744 that extends outward from the plane of the inner surface 751 of the seat body 721 in a manner similar to the configuration of the protrusion 544 of FIGS. 5A and 5B. There is also a sealing member 749, similar to the sealing member 549 discussed above, disposed in the protrusion 744 of the spring section 747.

Figure 8:
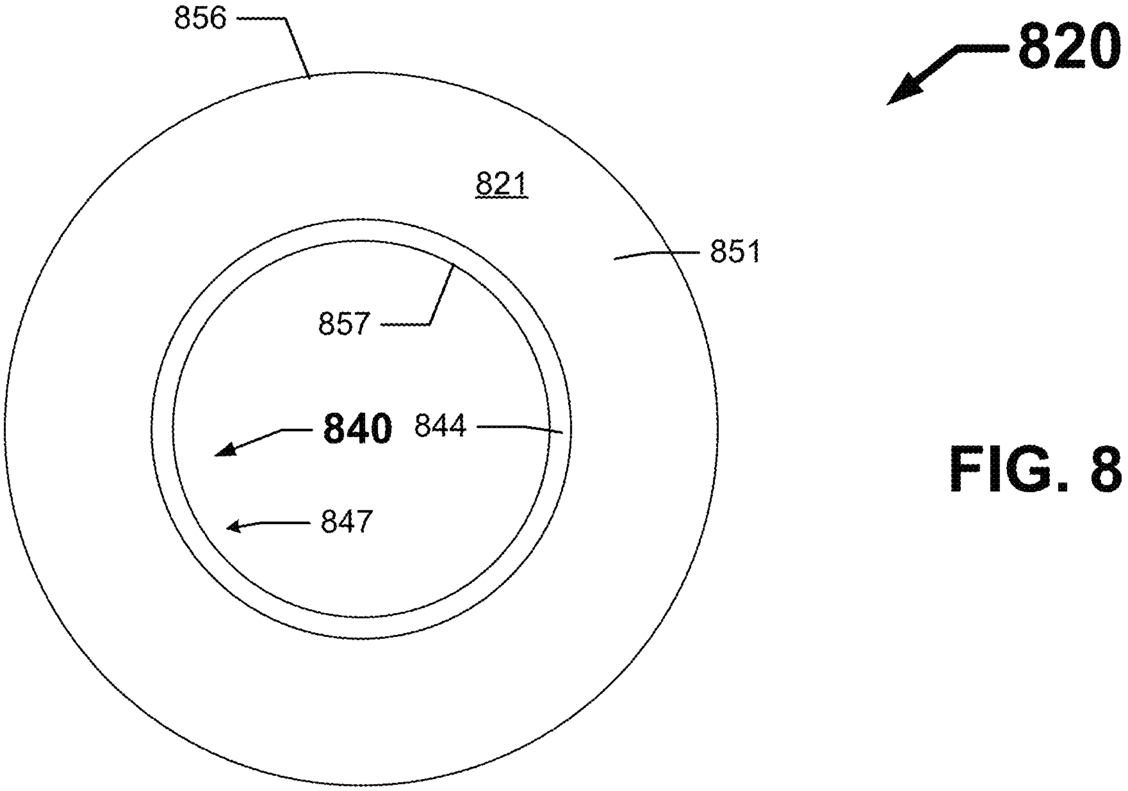
FIGS. 8 through 13 show front views of various example seats according to certain example embodiments.

Referring to FIG. 8, the front view of the seat 820 shows the inner surface 851, the inner perimeter 857, and the outer perimeter 856. Also shown in FIG. 8 is the protrusion 844 of the spring section 847 of the spring system 840. In this case, the protrusion 844 is ring-shaped and is positioned coincident with the inner perimeter 857 of the seat body 821. The cavity (e.g., similar to the cavity 545 discussed above with respect to FIGS. 5A and 5B) of the spring system 840 is hidden from view in FIG. 8, but can have any of a number of configurations. For example, the cavity can be a slot in the inner perimeter 857 of the seat body 821 having a depth that is greater than the height of the protrusion 844.

Figure 9:
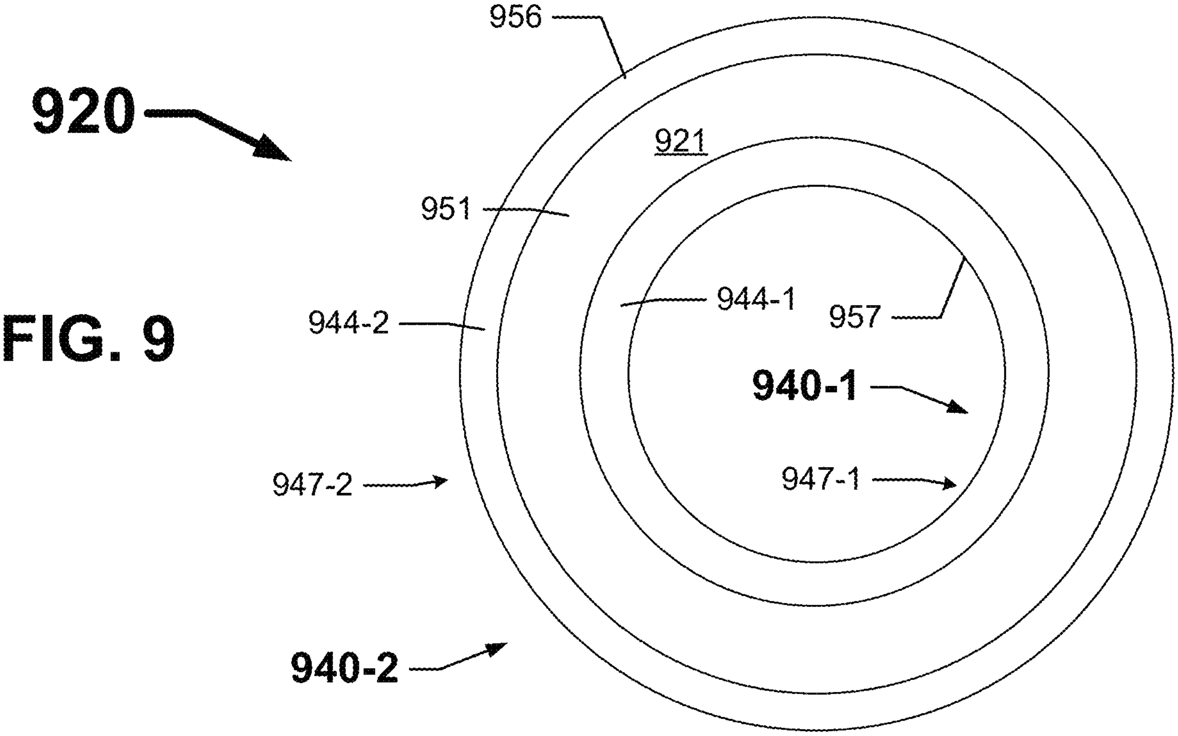

Referring to FIG. 9, the front view of the seat 920 shows the inner surface 951, the inner perimeter 957, and the outer perimeter 956. Also shown in FIG. 9 is the protrusion 944-1 of the spring section 947-1 of the spring system 940-1, as well as the protrusion 944-2 of the spring section 947-2 of the spring system 940-2. In this case, the protrusion 944-1 is ring-shaped and is positioned coincident with the inner perimeter 957 of the seat body 921, and the protrusion 944-2 is also ring-shaped and is positioned coincident with the outer perimeter 956 of the seat body 921. The two cavities (e.g., each similar to the cavity 545 discussed above with respect to FIGS. 5A and 5B) of the spring systems 940 is hidden from view in FIG. 9, but can have any of a number of configurations. For example, the cavity of the spring system 940-1 can be a slot in the inner perimeter 957 of the seat body 921 having a depth that is greater than the height of the protrusion 944-1, and the cavity of the spring system 940-2 can be a slot in the outer surface of the seat body 921 having a depth that is greater than the height of the protrusion 944-2.

Figure 10:
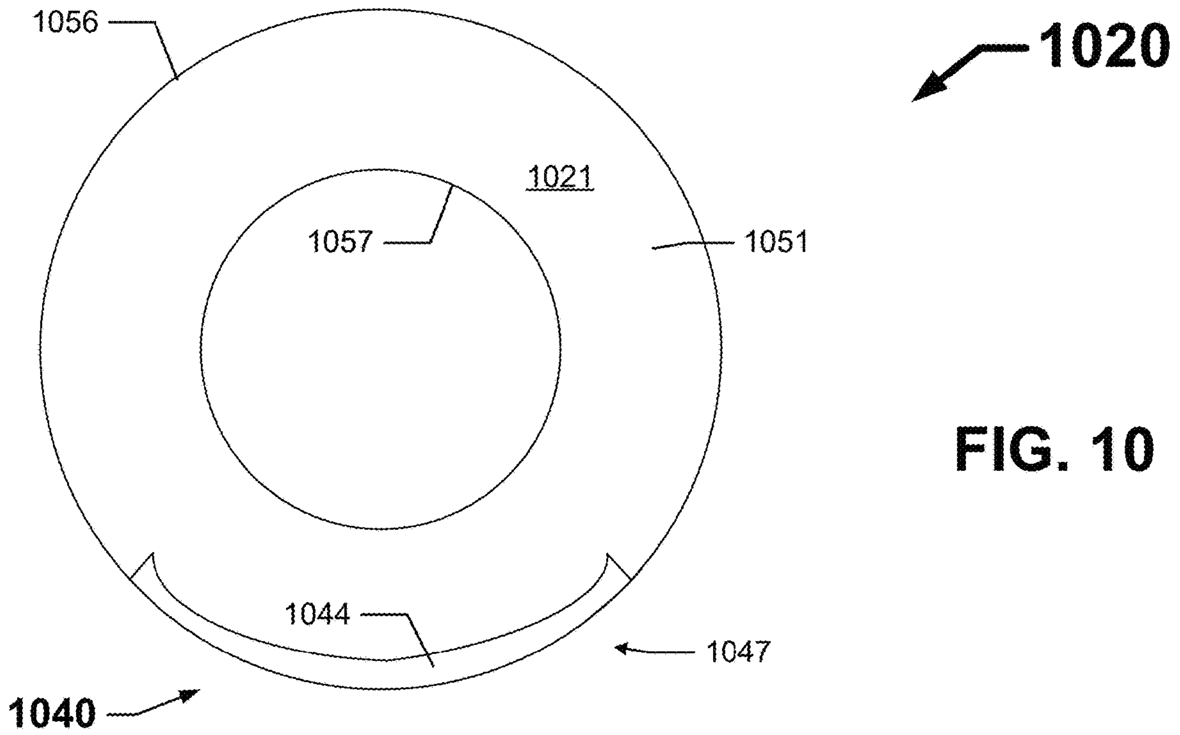

Referring to FIG. 10, the front view of the seat 1020 shows the inner surface 1051, the inner perimeter 1057, and the outer perimeter 1056. Also shown in FIG. 10 is the protrusion 1044 of the spring section 1047 of the spring system 1040. In this case, the protrusion 1044 is an arc segment that is positioned coincident with approximately the bottom quarter of the inner perimeter 1057 of the seat body 1021. The cavity (e.g., similar to the cavity 545 discussed above with respect to FIGS. 5A and 5B) of the spring system 1040 is hidden from view in FIG. 10, but can have any of a number of configurations. For example, the cavity can be a fully enclosed pocket within the seat body 1021 positioned behind and above the protrusion 1044.

Figure 11:
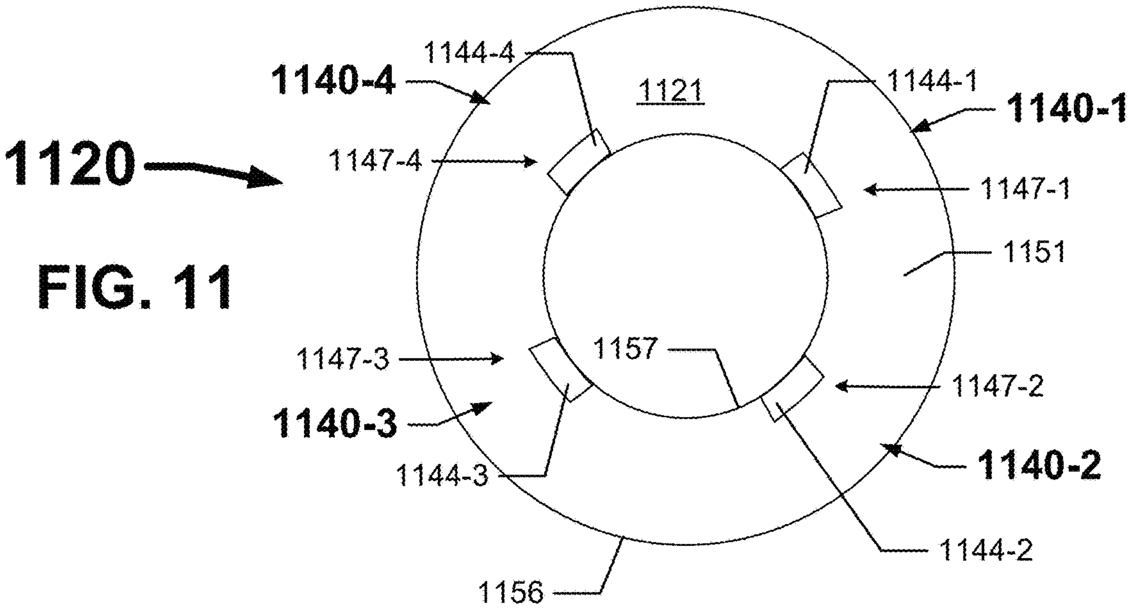

Referring to FIG. 11, the front view of the seat 1120 shows the inner surface 1151, the inner perimeter 1157, and the outer perimeter 1156. Also shown in FIG. 11 is the protrusion 1144-1 of the spring section 1147-1 of the spring system 1140-1, the protrusion 1144-2 of the spring section 1147-2 of the spring system 1140-2, the protrusion 1144-3 of the spring section 1147-3 of the spring system 1140-3, and the protrusion 1144-4 of the spring section 1147-4 of the spring system 1140-4. In this case, the four protrusions 1144 are arc segments that are positioned equidistantly from each other along the inner perimeter 1157 of the seat body 1121. The four cavities (e.g., similar to the cavity 545 discussed above with respect to FIGS. 5A and 5B) of the spring systems 1140 are hidden from view in FIG. 11, but can have any of a number of configurations. For example, each cavity can be a slot in the inner perimeter 1157 of the seat body 1121 having a depth and a width that are greater than the height and width of each corresponding protrusion 1144 of the spring system 1140.

Figure 12:
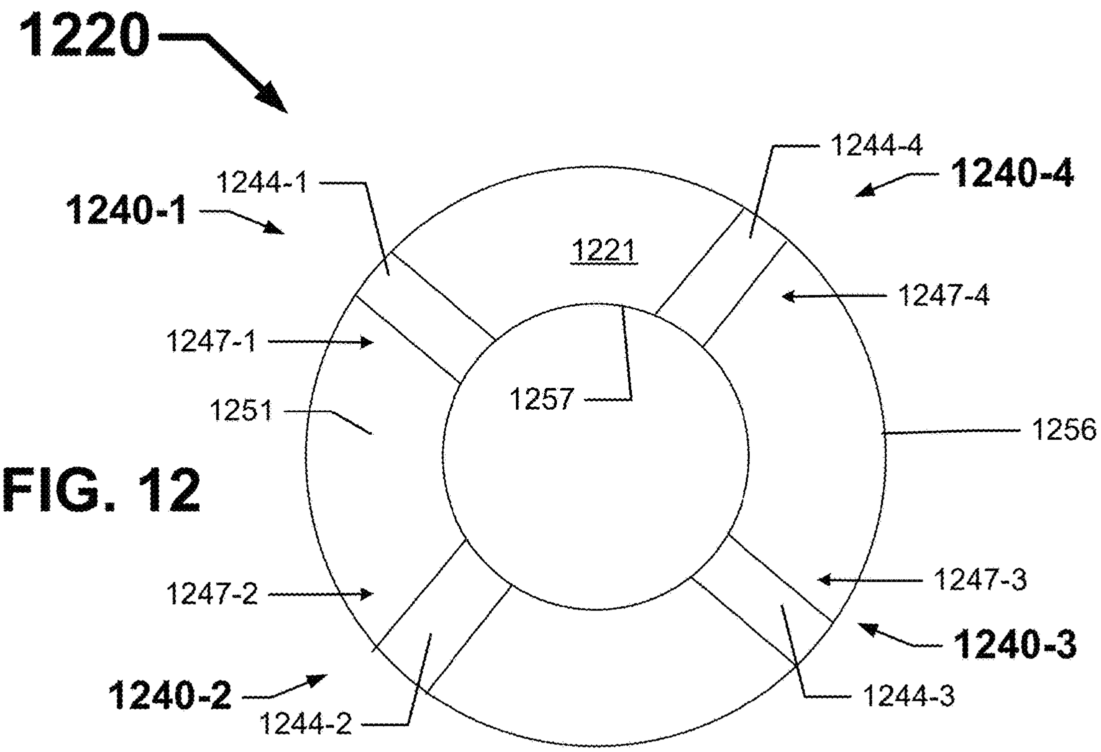

Referring to FIG. 12, the front view of the seat 1220 shows the inner surface 1251, the inner perimeter 1257, and the outer perimeter 1256. Also shown in FIG. 12 is the protrusion 1244-1 of the spring section 1247-1 of the spring system 1240-1, the protrusion 1244-2 of the spring section 1247-2 of the spring system 1240-2, the protrusion 1244-3 of the spring section 1247-3 of the spring system 1240-3, and the protrusion 1244-4 of the spring section 1247-4 of the spring system 1240-4. In this case, the four protrusions 1244 are semi-circular protrusions that are positioned equidistantly from each other, each running radially from the inner perimeter 1257 to the outer perimeter 1256 of the seat body 1221. The four cavities (e.g., similar to the cavity 545 discussed above with respect to FIGS. 5A and 5B) of the spring systems 1240 are hidden from view in FIG. 12, but can have any of a number of configurations. For example, each cavity can be a slot running behind the protrusion 1244 between the outer perimeter 1256 and the inner perimeter 1257 within the seat body 1221 having a width that is greater than the width of each corresponding protrusion 1244 of the spring system 1240.

Figure 13:
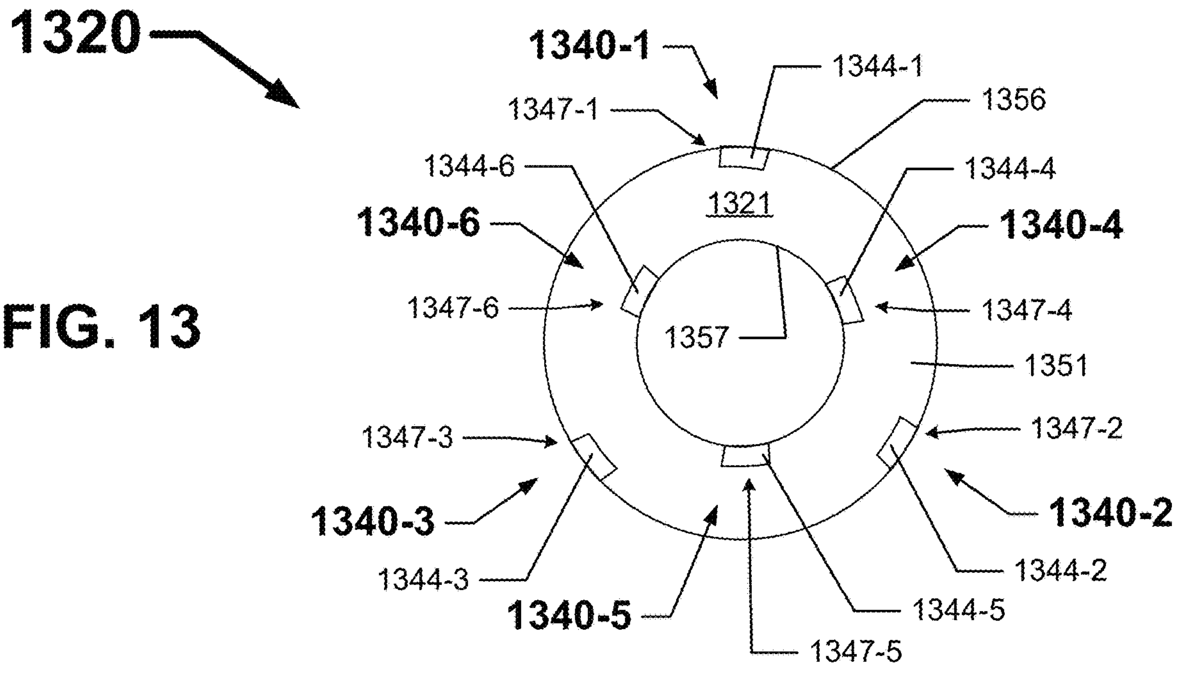

Referring to FIG. 13, the front view of the seat 1320 shows the inner surface 1351, the inner perimeter 1357, and the outer perimeter 1356. Also shown in FIG. 13 is the protrusion 1344-1 of the spring section 1347-1 of the spring system 1340-1, the protrusion 1344-2 of the spring section 1347-2 of the spring system 1340-2, the protrusion 1344-3 of the spring section 1347-3 of the spring system 1340-3, the protrusion 1344-4 of the spring section 1347-4 of the spring system 1340-4, the protrusion 1344-5 of the spring section 1347-5 of the spring system 1340-5, and the protrusion 1344-6 of the spring section 1347-6 of the spring system 1340-6. In this case, protrusion 1344-1, protrusion 1344-2, and protrusion 1344-3 are arc segments that are positioned equidistantly from each other along the outer perimeter 1356 of the seat body 1321, and protrusion 1344-4, protrusion 1344-5, and protrusion 1344-6 are arc segments that are positioned equidistantly from each other along the inner perimeter 1357 of the seat body 1321.

The six cavities (e.g., similar to the cavity 545 discussed above with respect to FIGS. 5A and 5B) of the spring systems 1340 are hidden from view in FIG. 13, but can have any of a number of configurations. For example, each cavity of the spring system 1340-1, the spring system 1340-2, and the spring system 1340-3 can be a slot in the outer perimeter 1356 of the seat body 1321 having a depth and a width that are greater than the height and width of each corresponding protrusion 1344 of the spring system 1340. Similarly, each cavity of the spring system 1340-4, the spring system 1340-5, and the spring system 1340-6 can be a slot in the inner perimeter 1357 of the seat body 1321 having a depth and a width that are greater than the height and width of each corresponding protrusion 1344 of the spring system 1340.

Figure 14:
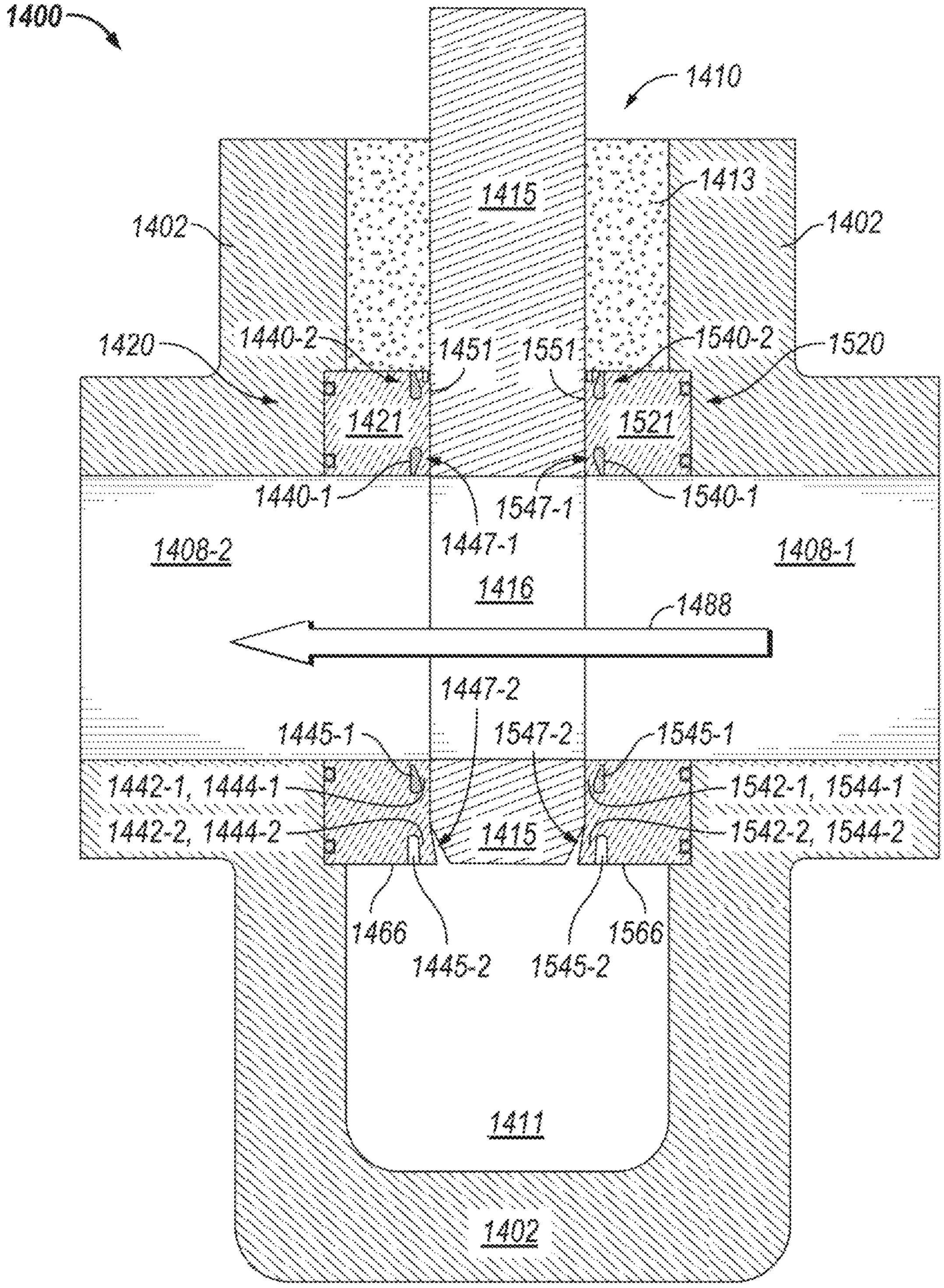
FIG. 14 shows a sectional view of part of a gate valve with the gate in the open position according to certain example embodiments.
Figure 15:
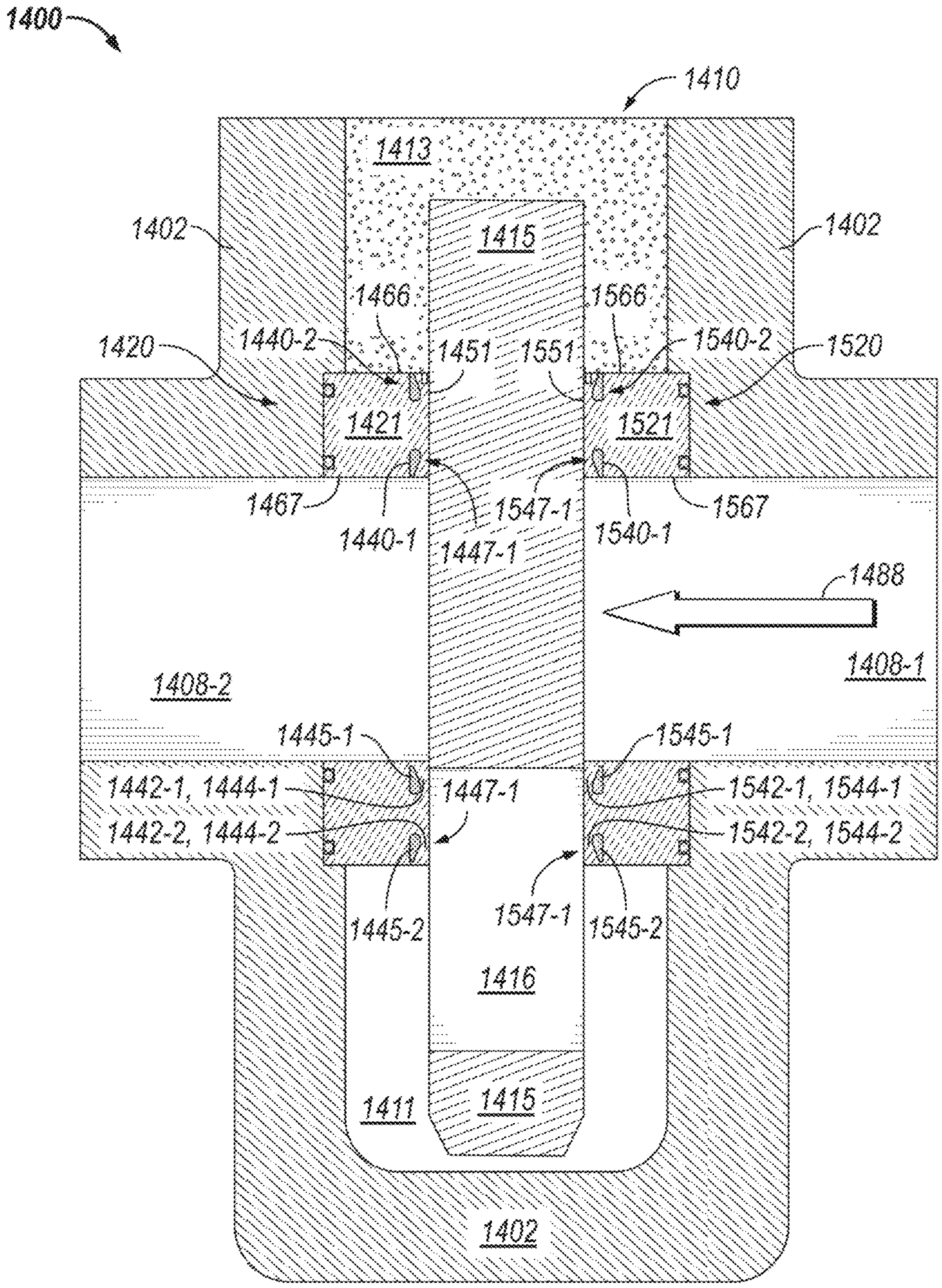
FIG. 15 shows a sectional view of part of the gate valve of FIG. 14 with the gate in the closed position according to certain example embodiments.

FIG. 14 shows a sectional view of part of a gate valve 1400 with the gate 1415 in the open position according to certain example embodiments. FIG. 15 shows a sectional view of part of the gate valve 1400 of FIG. 14 with the gate 1415 in the closed position according to certain example embodiments. Referring to FIGS. 1 through 15, the gate valve 1400 of FIGS. 14 and 15 includes a valve body 1402, a bore 1408, a valve trim 1410, and two example seats (seat 1420 and seat 1520). These components of the gate valve 1400, including portions thereof, can be substantially the same as the valve bodies, the bores, the valve trims, and the example seats (including corresponding portions thereof) discussed above. For example, the valve body 1402 can form a proximal receiving area 1413 and a distal receiving area 1411 for the gate 1415 and/or other parts of the valve trim 1410.

The seat 1420 surrounds the bore portion 108-2 of the bore 108 and is positioned between the gate 1415 and the valve body 1402. The seat 1420 is configured similar to the seat 920 of FIG. 9. Specifically, the seat 1420 includes a spring system 1440-1 and a spring system 1440-2. The spring system 1440-1 is located along the inner surface 1451 toward the inner perimeter 1467, and the spring system 1440-2 is located along the inner surface 1451 toward the outer perimeter 1466. The spring system 1440-1 includes a cavity 1451-1 and a spring section 1447-1 that includes a base portion 1442-1 and a protrusion 1444-1. The spring system 1440-2 includes a cavity 1451-2 and a spring section 1447-2 that includes a base portion 1442-2 and a protrusion 1444-2.

Also, the seat 1520 is configured similar to the seat 920 of FIG. 9. Specifically, the seat 1520 includes a spring system 1540-1 and a spring system 1540-2. The spring system 1540-1 is located along the inner surface 1551 toward the inner perimeter 1567, and the spring system 1540-2 is located along the inner surface 1551 toward the outer perimeter 1566. The spring system 1540-1 includes a cavity 1551-1 and a spring section 1547-1 that includes a base portion 1542-1 and a protrusion 1544-1. The spring system 1540-2 includes a cavity 1551-2 and a spring section 1547-2 that includes a base portion 1542-2 and a protrusion 1544-2.

When the gate 1415 is in the open position, as shown in FIG. 14, the hole 1416 in the gate 1415 is aligned with the bore 1408, thereby allowing a fluid 1488 to flow from the upstream bore portion 1408-1 of the bore 1408, through the hole 1416 in the gate 1415, and through the downstream bore portion 1408-2 of the bore 1408. Also, the gate 1415, when in the open position, abuts against and engages all of the extension 1444-1 of the spring section 1447-1 of the seat 1420 and all of the extension 1544-1 of the spring section 1547-1 of the seat 1520, which compresses the cavity 1445-1 and the cavity 1545-1, respectively. When in the open position, the gate 1415 also abuts against and engages the extension 1444-2 except for the portion on the lower ⅛$^{th}$ of the seat body 1421 and the extension 1544-2 except for the portion on the lower ⅛$^{th}$ of the seat body 1521, which compresses the cavity 1445-2 except for the portion on the lower ⅛$^{th}$ of the seat body 1421 and the cavity 1545-2 except for the portion on the lower ⅛$^{th}$ of the seat body 1521, respectively.

Under this operating condition, the configuration of the example seat 1420 and the example seat 1520 result in a substantially higher contact pressure relative to the current art when the bore pressure is relatively low (e.g., less than 10% of the RWP). When the gate 1415 closes, as shown in FIG. 15, the gate 1415 above the hole 1416 completely covers the bore 1408, and also makes full contact with all of the inner surface 1451 of the seat 1420 and with all of the inner surface 1551 of the seat 1520. As a result, the gate 1415, when in the closed position, abuts against and engages all of the extension 1444-1 of the spring section 1447-1 of the seat 1420, all of the extension 1444-2 of the spring section 1447-2 of the seat 1420, all of the extension 1544-1 of the spring section 1547-1 of the seat 1520, and all of the extension 1544-2 of the spring section 1547-2 of the seat 1520, which compresses the cavity 1445-1, the cavity 1445-2, the cavity 1545-1, and the cavity 1545-2, respectively. Also, the closed gate 1415 keeps the fluid 1488 from flowing from the bore portion 1408-1 into the bore portion 1408-2.

Figure 16:
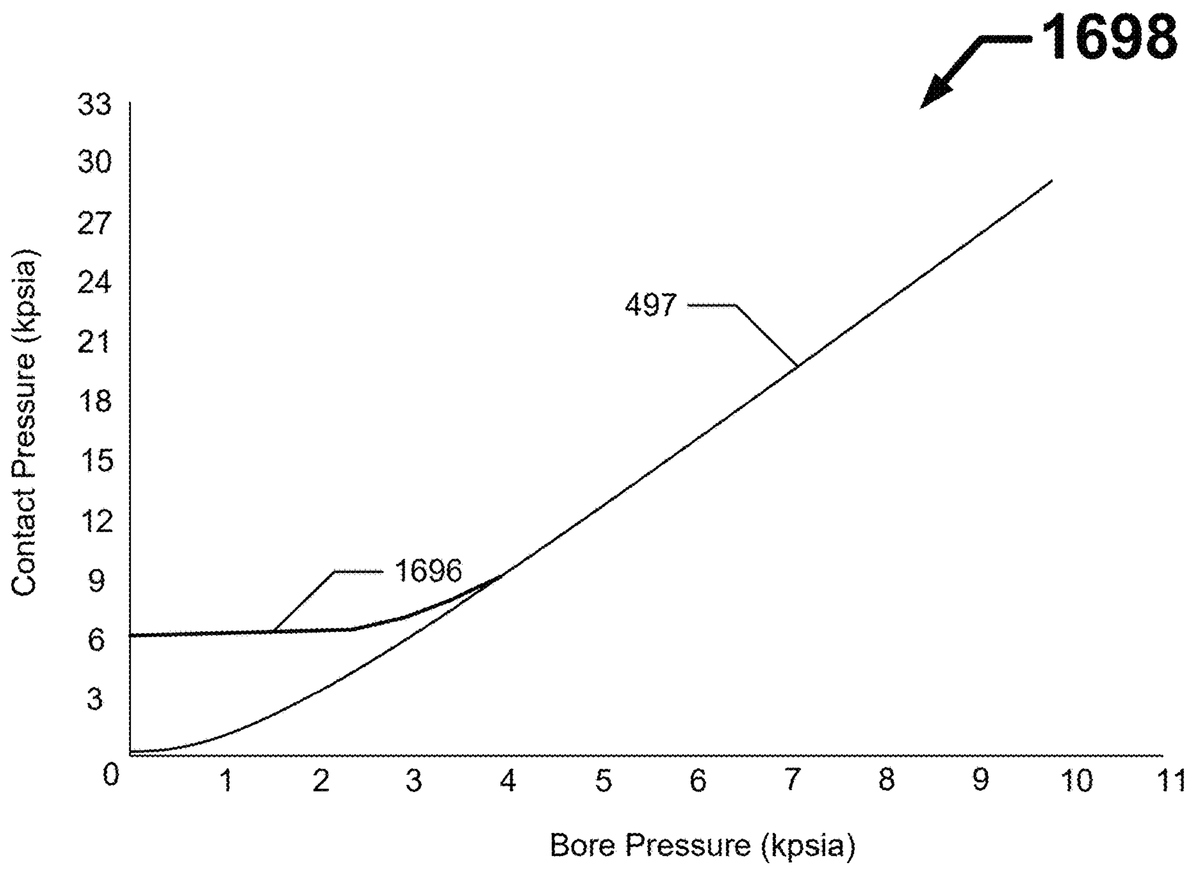
FIG. 16 shows a graph of contact pressure versus bore pressure for a gate valve according to certain example embodiments.

FIG. 16 shows a graph 1698 of contact pressure versus bore pressure for a gate valve according to certain example embodiments. Specifically, the graph 1698 of FIG. 16 shows data plotted using the gate valve 1400 of FIGS. 14 and 15. Referring to FIGS. 1 through 16, the graph 1698 of FIG. 16 includes the plot 497 of contact pressure (shown on the vertical axis in kpsia) and pressure (shown on the horizontal axis in kpsia) within the bore (e.g., bore 108) of a gate valve (e.g., gate valve 100) from the graph 498 of FIGS. 4A and 4B. Using the example seats (in this case, seat 1420 and seat 1520), at lower core pressures of approximately less than 2600 psia, plot 1696 shows that the contact pressure is substantially constant at 6500 psia. In this way, the seat 1420 maintains a contact pressure with the gate 1415 that is at least twice a pressure within the bore 1408 between the gate 1415 and the inlet when the bore pressure is within 10% of RWP of the gate valve 1400. These contact pressure values are significantly higher than what is realized using seats in the current art. As a result, failures of the gate valve 1400 at these lower pressures, which constitute the vast majority of the operating pressure for the gate valve 1400, are eliminated or significantly reduced.

Figure 17A:
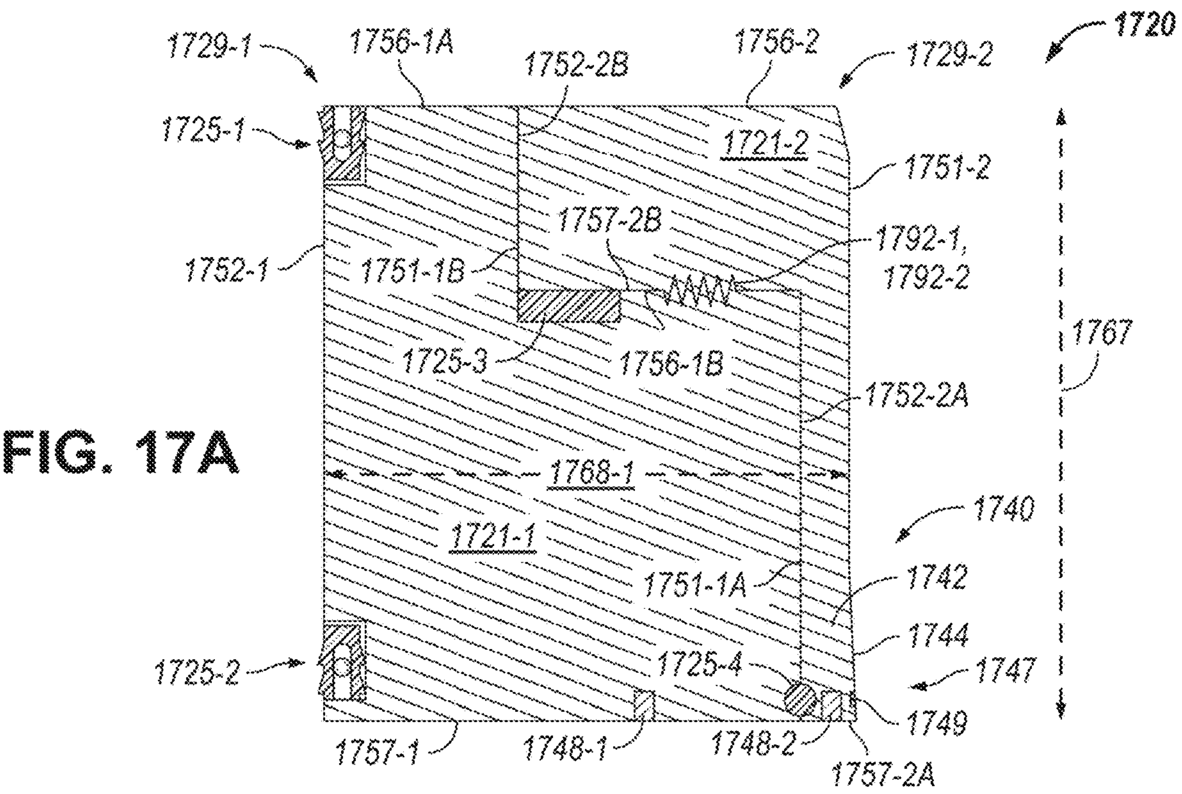
FIGS. 17A and 17B show another example of a seat for a gate valve according to certain example embodiments.
Figure 17B:
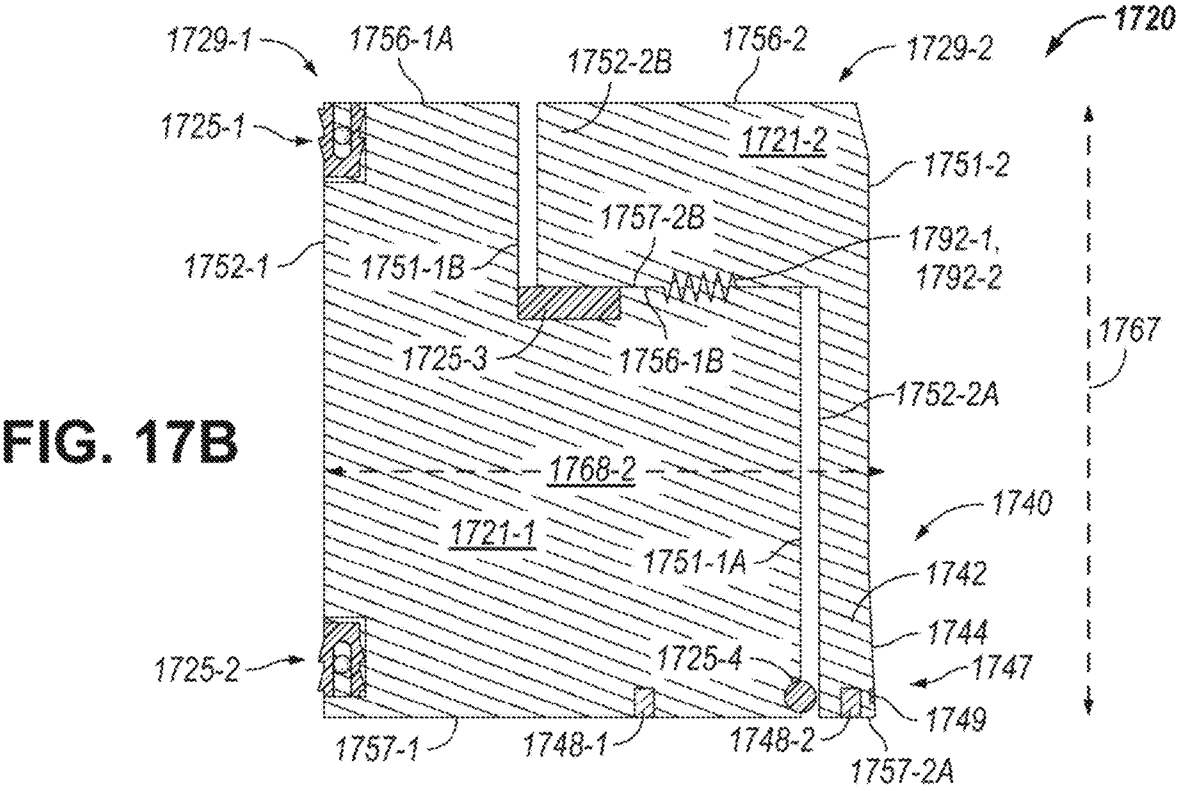

FIGS. 17A and 17B show another example of a seat 1720 for a gate valve according to certain example embodiments. Specifically, FIG. 17A shows a sectional view of the seat 1720 in a consolidated position, and FIG. 17B shows a sectional view of the seat 1720 in an expanded position. Referring to FIGS. 1 through 17B, the seat 1720 can include any of a number of multiple (e.g., two, three, five) pieces, where adjacent pieces are configured to be movably coupled to each other. In this case, the seat 1720 has two pieces 1729

(piece 1729-1 and piece 1729-2). In such cases, each piece 1729 of the seat 1720 includes a seat body 1721 having one or more inner surfaces 1751, one or more outer surfaces 1752, one or more inner perimeters 1757, and one or more outer perimeters 1756.

Piece 1729-1 of the seat 1720 of FIGS. 17A and 17B generally has a "L" shape and has a body 1721-1 with one outer surface 1752-1, one inner perimeter 1757-1, two inner surfaces 1751-1 (with inner surface 1751-1A being further away from the outer surface 1752-1 relative to the inner surface 1751-1B and adjacent to the inner perimeter 1757-1), and two outer perimeters 1756 (with the outer perimeter 1756-1A positioned between the outer surface 1752-1 and the inner surface 1751-1B and with the outer perimeter 1756-1B positioned between the inner surface 1751-1A and the inner surface 1751-1B).

The piece 1729-1 can include one or more coupling features 1792-1 that allow the piece 1729-1 to be movably coupled, directly or indirectly, to the piece 1729-2. For example, in this case, a coupling feature 1792-1 in the form of mating threads is disposed on part of the outer perimeter 1756-1B to allow the piece 1729-1 to be directly movably coupled to the piece 1729-2. The one or more coupling features 1792-1 of the piece 1729-1 are configured to complement one or more coupling features 1792-2 of the piece 1729-2 of the seat 1720.

There are four sealing members 1725 disposed on the piece 1729-1 of the seat 1720. Sealing member 1725-1 is positioned toward the outer perimeter 1756-1A of the seat body 1721-1 along the outer surface 1752-1. Sealing member 1725-2 is positioned toward the inner perimeter 1757-1 along the outer surface 1752-1 of the seat body 1721-1. The sealing member 1725-1 and the sealing member 1725-2 are configured to interact with a wall of the valve body (e.g., valve body 1402) and are substantially similar to the sealing members discussed above.

Sealing member 1725-3 is positioned toward the inner surface 1751-1B along the outer perimeter 1756-1B of the seat body 1721-1. The sealing member 1725-3 is configured to interact with the inner perimeter 1757-2B of the piece 1729-2 of the seat 1720 and is substantially similar to the sealing members discussed above. Sealing member 1725-4 is positioned toward the inner perimeter 1757-1 along the inner surface 1751-1A of the seat body 1721-1. The sealing member 1725-4 is configured to interact with the outer surface 1752-2A of the piece 1729-2 of the seat 1720, particularly when the seat 1720 is in the consolidated position shown in FIG. 17A, and is substantially similar to the sealing members discussed above.

The piece 1729-1 of the seat 1720 does not include the spring system 1740, except that when the seat 1720 is in the expanded position shown in FIG. 17B, the inner surface 1751-1A of the piece 1729-1 forms part of the cavity 1745. In certain example embodiments, the piece 1729-1 can include one or more optional keys 1748 that can be used to properly align the piece 1729-1 of the seat 1720 within the gate valve (e.g., gate valve 1400). In such cases, the key 1748 can be substantially the same and serve the same functions as the key 548 discussed above. In this example, the piece 1729-1 is in the form of a notch and is located along the inner perimeter 1757-1 of the piece 1729-1.

Piece 1729-2 of the seat 1720 of FIGS. 17A and 17B generally has an inverted backwards "L" shape and has a body 1721-2 with two outer surfaces 1752-2 (with outer surface 1752-2B being further away from the inner surface 1751-2 relative to the outer surface 1752-2A and adjacent to the outer perimeter 1756-2), two inner perimeters 1757-2 (with the inner perimeter 1757-2A positioned between the outer surface 1752-2A and the inner surface 1751-2 and with the inner perimeter 1757-2B positioned between the outer surface 1752-2A and the outer surface 1752-2B), one inner surface 1751-2, and one outer perimeter 1756.

The piece 1729-2 can include one or more coupling features 1792-2 that allow the piece 1729-2 to be movably coupled, directly or indirectly, to the piece 1729-1. For example, in this case, a coupling feature 1792-2 in the form of mating threads is disposed on part of the inner perimeter 1757-2B to allow the piece 1729-2 to be directly movably coupled to the piece 1729-1. The one or more coupling features 1792-2 of the piece 1729-2 are configured to complement one or more coupling features 1792-1 of the piece 1729-1 of the seat 1720.

The piece 1729-2 of the seat 1720 also includes a spring system 1740 that includes a spring section 1747. The cavity 1745 of the spring system 1740 in this case is located between the inner surface 1751-1A of the piece 1729-1, the inner perimeter 1757-2B of the piece 1729-2, and the outer surface 1752-2A of the piece 1729-2 when the seat 1720 is in the expanded position shown in FIG. 17B. When the seat 1720 is in the consolidated position, as shown in FIG. 17A, the cavity 1745 is non-existent (if the inner surface 1751-1A of the piece 1729-1 and the outer surface 1752-2A of the piece 1729-2 are in direct contact with each other) or minimal (e.g., if the sealing member 1725-4 provides a slight gap between the inner surface 1751-1A of the piece 1729-1 and the outer surface 1752-2A of the piece 1729-2). As the piece 1729-2 and the piece 1729-1 move apart from each other using the coupling features 1792, the size of the cavity 1745 increases.

The spring section 1747 includes a base portion 1742 and a protrusion 1744 that extends outward from the plane of the inner surface 1751-2 of the piece 1729-2 in a manner similar to the configuration of the protrusion 544 of FIGS. 5A and 5B. There is also a sealing member 1749, similar to the sealing member 549 discussed above, disposed in the protrusion 1744 of the spring section 1747. The piece 1729-2 can also include one or more optional keys 1748 that can be used to properly align the piece 1729-2 of the seat 1720 within the gate valve (e.g., gate valve 1400). In such cases, the key 1748 can be substantially the same and serve the same functions as the key 548 discussed above. In this example, the piece 1729-2 is in the form of a notch and is located along the inner perimeter 1757-2A of the piece 1729-2.

In certain example embodiments, the piece 1729-2 (or portions thereof) of the seat 1720 is made of a material that has a high hardness (e.g., tungsten carbide) and/or other characteristics relative to the material (e.g., 410 stainless steel) of the piece 1729-1 (or portions thereof) of the seat 1720. In some cases, splitting the hard materials for the piece 1729-2 and the soft materials for the piece 1729-1 can be done without requiring thermal application. Using relatively softer materials for the piece 1729-1, which is larger than the piece 1729-2, can result in using less expensive material that is relatively easier to machine compared to the hard material of the piece 1729-2 and, in many cases, the single piece seats commonly used today.

When the seat 1720 is installed into a gate valve (e.g., gate valve 1400), the seat 1720 can be in a consolidated position, as shown in FIG. 17A. In this state, the seat 1720 has a height 1767 and a width (thickness) 1768-1. In this consolidated position, in certain example embodiments, no part of the seat 1720, including the protrusion 1744 of the spring section 1747, makes contact with the gate (e.g., gate 1415)

of the gate valve, regardless of the position of the gate. In other cases, any contact between the protrusion 1744 of the spring section 1747 and the gate when the seat 1720 is in the consolidated position is minimal.

When the gate valve is completely assembled, the pieces 1729 of the seat 1720 can be separated from each other using the coupling features 1792, putting the seat 1720 in the expanded position shown in FIG. 17B. In this state, the seat 1720 has a height 1767 and a width (thickness) 1768-2 that is greater than the width 1768-1. This can be accomplished, for example, using a tool to rotate the piece 1729-2 of the seat 1720 relative to the piece 1729-1 to a fixed torque. The torque can correlate to an initial spring condition of the spring section 1747 of the spring system 1740. In this way, tolerancing, which can be difficult to achieve with a seat 1720 configured as a single piece (e.g., by pulling in a spring), can be properly set more easily.

Figure 18A:
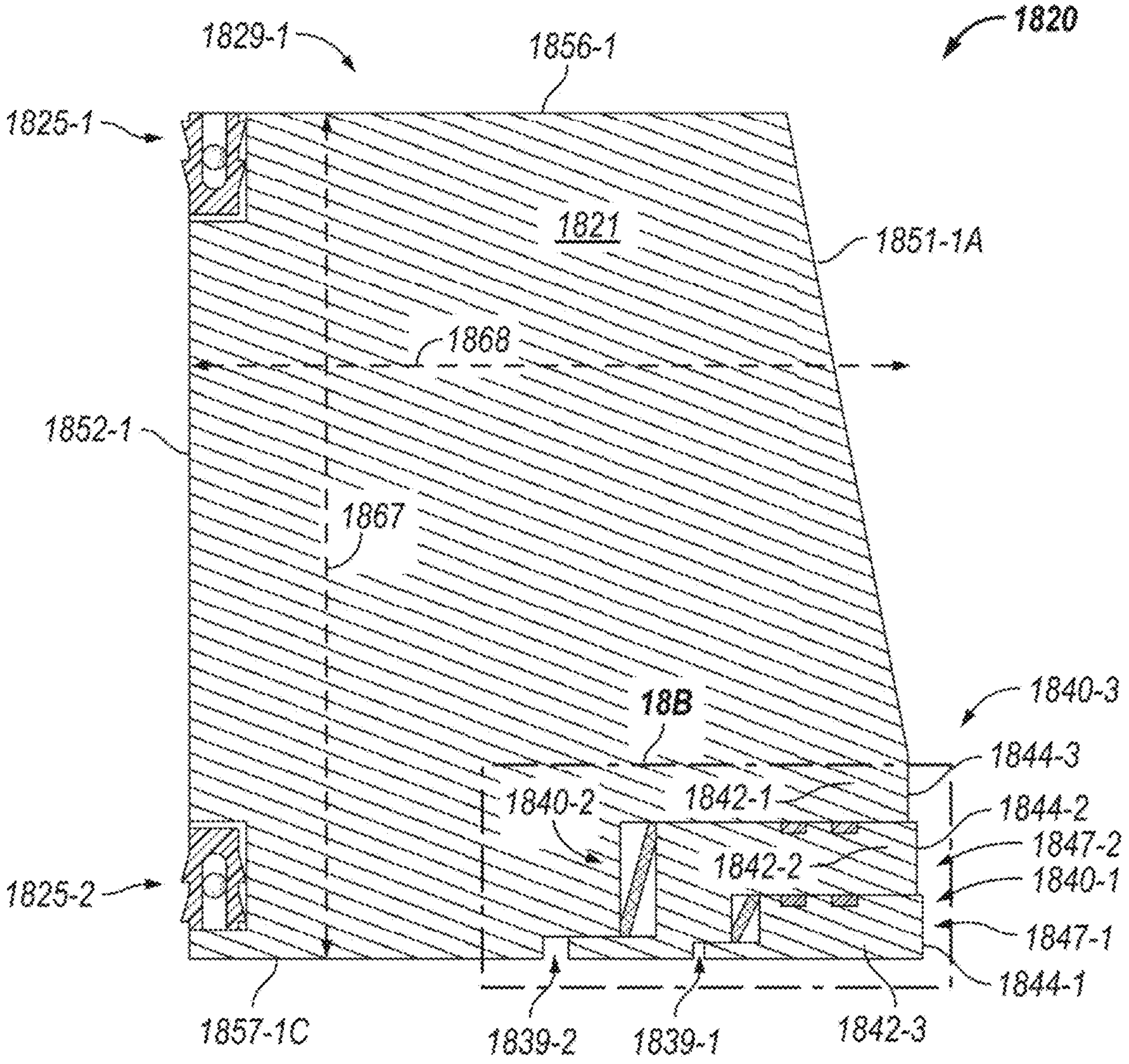
FIGS. 18A and 18B show yet another example of a seat for a gate valve according to certain example embodiments.
Figure 18B:
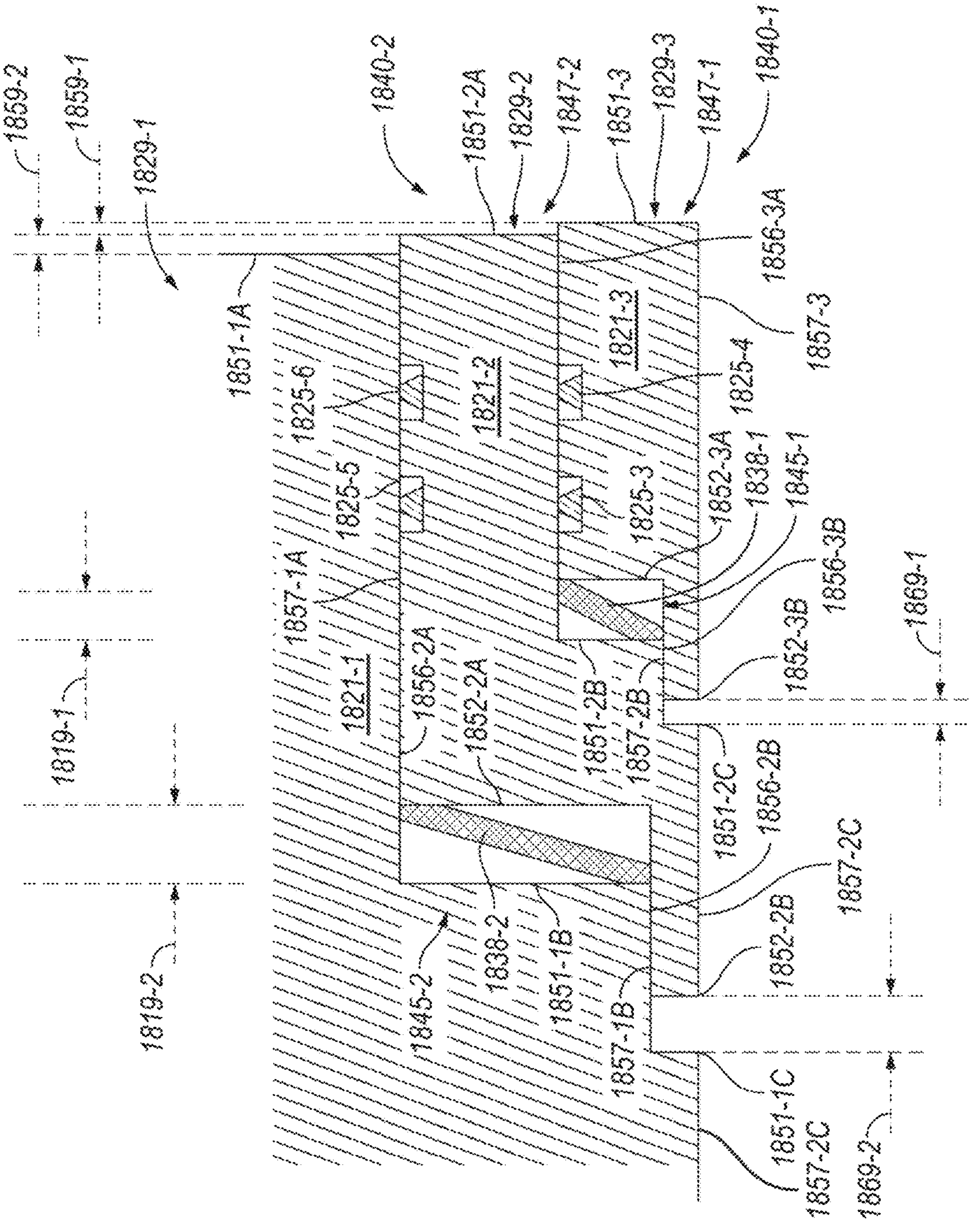

FIGS. 18A and 18B show yet another example of a seat 1820 for a gate valve according to certain example embodiments. Specifically, FIG. 18A shows a sectional view of the seat 1820, and FIG. 18B shows a detailed view of the seat 1820 of FIG. 18A. Referring to FIGS. 1 through 18B, the seat 1820 can include any of a number of multiple (e.g., two, three, five) pieces, where adjacent pieces are configured to be movably coupled to each other. In this case, the seat 1820 has three pieces 1829 (piece 1829-1, piece 1829-2, and piece 1829-3) arranged in a telescoping fashion. In such cases, each piece 1829 of the seat 1820 includes a seat body 1821 having one or more inner surfaces 1851, one or more outer surfaces 1852, one or more inner perimeters 1857, and one or more outer perimeters 1856.

Piece 1829-1 of the seat 1820 of FIGS. 18A and 18B is the largest of the 3 pieces 1829. The piece 1829-1 has a generally rectangular cross-sectional shape, except for a portion carved out of its inner surface 1851 and its inner perimeter 1857. The piece 1829-1 has a body 1821-1 with one outer surface 1852-1, one outer perimeter 1856-1, three inner surfaces 1851-1 (with inner surface 1851-1A being further away from the outer surface 1852-1 relative to the inner surface 1851-1B, and with the inner surface 1851-1B being further away from the outer surface 1852-1 relative to the inner surface 1851-1C, and with the inner surface 1851-1C being adjacent to the inner perimeter 1857-1C), and three inner perimeters 1857 (with the inner perimeter 1857-1A positioned between the inner surface 1851-1B and the inner surface 1851-1A, with the inner perimeter 1857-1B positioned between the inner surface 1851-1B and the inner surface 1851-1C, and with the inner perimeter 1857-1C positioned between the outer surface 1852-1 and the inner surface 1851-1C).

There are two sealing members 1825 disposed on each of the pieces 1829 of the seat 1820. Sealing member 1825-1 is positioned toward the outer perimeter 1856-1 of the seat body 1821-1 along the outer surface 1852-1. Sealing member 1825-2 is positioned toward the inner perimeter 1857-1C along the outer surface 1852-1 of the seat body 1821-1. The sealing member 1825-1 and the sealing member 1825-2 are configured to interact with a wall of the valve body (e.g., valve body 1402) and are substantially similar to the sealing members discussed above.

Sealing member 1825-3 and sealing member 1825-4 are disposed adjacent to each other along the outer perimeter 1856-3A of the seat body 1821-3, with sealing member 1825-4 being positioned slightly closer to the inner surface 1851-3 and with sealing member 1825-3 being positioned slightly closer to the outer surface 1852-3A. The sealing member 1825-3 and the sealing member 1825-4 are configured to interact with the inner perimeter 1857-2A of the piece 1829-2 of the seat 1820 and are substantially similar to the sealing members discussed above.

Sealing member 1825-5 and sealing member 1825-6 are disposed adjacent to each other along the outer perimeter 1856-2A of the seat body 1821-2, with sealing member 1825-6 being positioned slightly closer to the inner surface 1851-2A and with sealing member 1825-5 being positioned slightly closer to the outer surface 1852-2A. The sealing member 1825-5 and the sealing member 1825-6 are configured to interact with the inner perimeter 1857-1A of the piece 1829-1 of the seat 1820 and are substantially similar to the sealing members discussed above.

The piece 1829-1 of the seat 1820 may not itself include the spring system 1840-1, but piece 1829-1 shares part of a spring system 1840-2 with the piece 1829-2 by virtue of the inner surface 1851-1B of the piece 1829-1 forms part of the cavity 1845-2 inside of which one or more resilient devices 1838-2 (e.g., a Belleville spring) are disposed. All but the bottom of the inner surface 1851-1A in this case has a large negative slope. In alternative embodiments, the inner surface 1851-1A can be vertical. In alternative embodiments, the piece 1829-1 can include a spring system 1840-1 with a spring section 1847-3 having a base portion 1842-3 and a protrusion 1844-3 that extends outward to form the inner surface 1851-1A of the piece 1829-1. In such cases, there can be one or more apertures (e.g., similar to the apertures 1445 discussed above), located proximate to the protrusion 1844-3, in the body 1821-1 of the piece 1829-1. In this case, the protrusion 1844-3 (and so also the bottom of the inner surface 1851-1A) are substantially vertical. In alternative embodiments, the bottom of the inner surface 1851-1A can have a large negative slope, as with the rest of the inner surface 1851-1A. In this case, the piece 1829-1 does not include any features (e.g., the keys 1748 discussed above) that can be used to align the piece 1829-1 and the piece 1829-2 of the seat 1820 relative to each other.

Piece 1829-2 of the seat 1820 of FIGS. 18A and 18B generally has a rectangular cross-sectional shape with a lateral extension from the bottom of its outer surface 1852-2B. The piece 1829-2 has a body 1821-2 with two outer surfaces 1852-2 (with outer surface 1852-2B being further away from any of the three the inner surfaces 1851-2 relative to the outer surface 1852-2A, where the outer surface 1852-2B is adjacent to the outer perimeter 1856-2B, and where the outer surface 1852-2B forms part of the cavity 1845-2 of the spring system 1840-2), three inner perimeters 1857-2 (with the inner perimeter 1857-2A positioned between the inner surface 1851-2A and the inner surface 1851-2B, with the inner perimeter 1857-2B positioned between the inner surface 1851-2B and the inner surface 1851-2C, and with inner perimeter 1857-2C positioned between the inner surface 1851-2C and the outer surface 1852-2B), three inner surfaces 1851-2 (with the inner surface 1851-2A positioned between the outer perimeter 1856-2A and the inner perimeter 1857-2A, with the inner surface 1851-2B positioned between the inner perimeter 1857-2A and the inner perimeter 1857-2B, and with the inner surface 1851-2C positioned between the inner perimeter 1857-2B and the inner perimeter 1857-2C), and two outer perimeters 1856-2 (with the outer perimeter 1856-2A positioned between the inner surface 1851-2A and the outer surface 1852-2A, and with the outer perimeter 1856-2B positioned between the outer surface 1852-2A and the outer surface 1852-2B).

The piece 1829-2 of the seat 1820 also includes a spring system 1840-2, which is partly shared with the piece 1829-1 as discussed above, and shares part of another spring system 1840-1 with the piece 1829-3. The spring system 1840-2 includes a spring section 1847-2. The cavity 1845-2 of the spring system 1840-2 in this case is located between the inner surface 1851-1B of the piece 1829-1, the inner perimeter 1857-1A of the piece 1829-1, the outer surface 1852-2B of the piece 1829-2, and the outer perimeter 1856-2B of the piece 1829-2, regardless of whether the seat 1820 is in the expanded position (as shown in FIGS. 18A and 18B), a partially consolidated position (as shown in FIG. 19A below), or a fully consolidated position (as shown in FIG. 19B below).

Figure 19A:
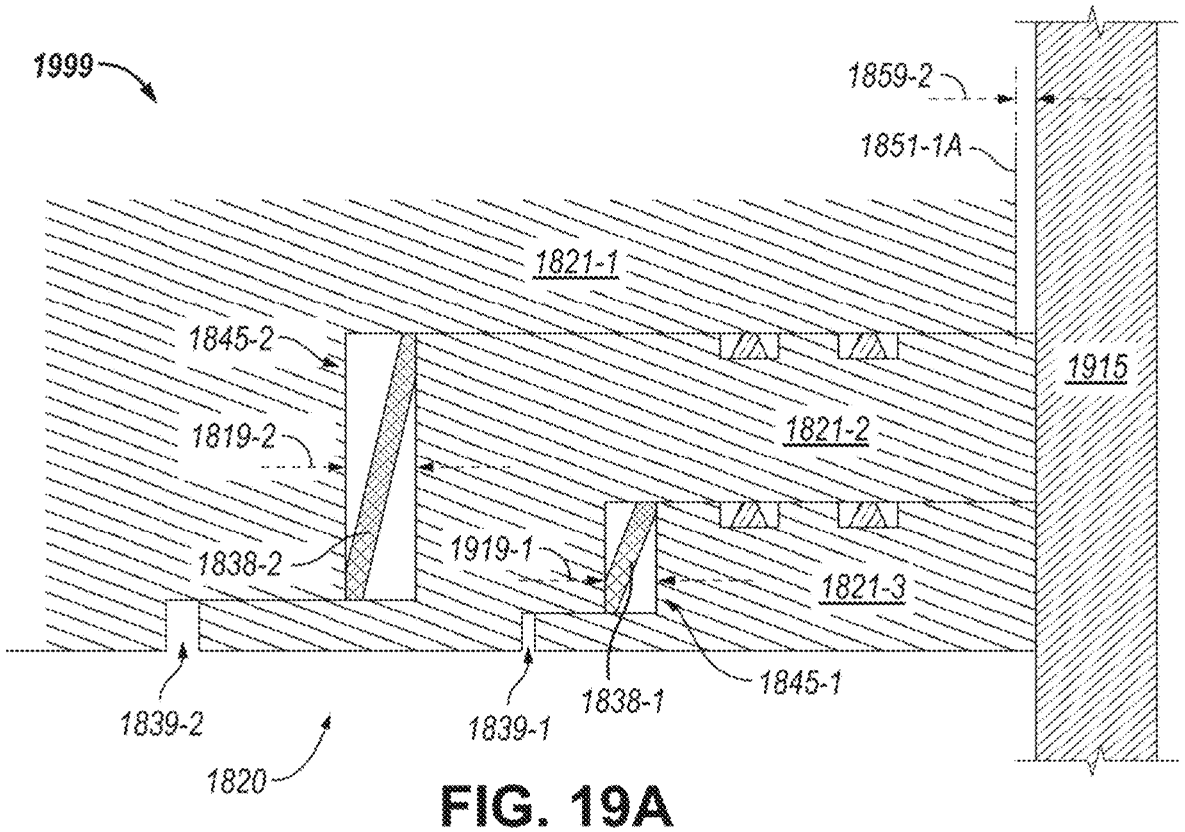
FIGS. 19A and 19B show a subsystem that includes the seat of FIGS. 18A and 18B interacting with a gate for a gate valve according to certain example embodiments.
Figure 19B:
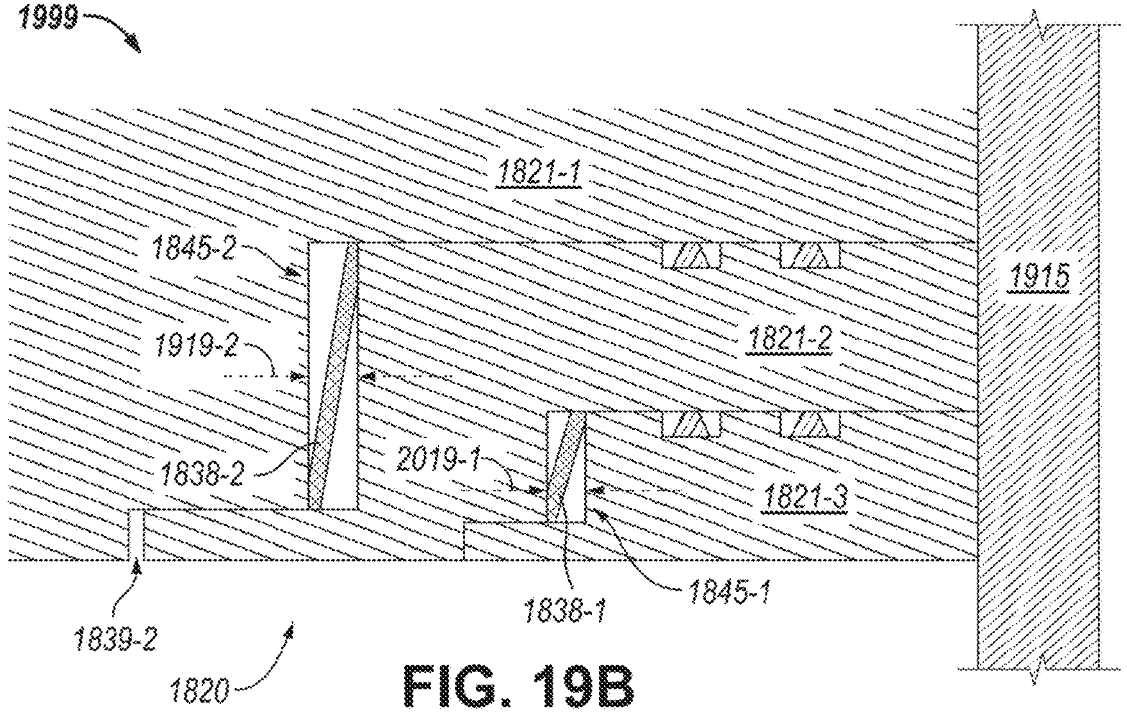

When the seat 1820 is in the expanded position, as shown in FIGS. 18A and 18B, the cavity 1845-2 has a width 1819-2, which shrinks as the seat 1820 moves to a partially or fully consolidated position, as shown in FIGS. 19A and 19B below. Because of the resilient device 1838-2 within the cavity 1845-2 and/or because the maximum width 1869-2 of the gap 1839-2 is less than the maximum width 1819-2 of the cavity 1845-2, the width 1819-2 of the cavity 1845-2 does not reach zero.

The spring section 1847-2 includes a base portion 1842-2 and a protrusion 1844-2 that extends outward to form the inner surface 1851-2A of the piece 1829-2. In this case, the protrusion 1844-2 (and so also the inner surface 1851-2A) are substantially vertical. In alternative embodiments, the inner surface 1851-2A can have a large negative slope. In this case, the spring section 1847-2 does not have any sealing members or keys, such as what is discussed above. The piece 1829-2 (or portions thereof) of the seat 1820 can be made of or include the same or a different material relative to the one or more materials of the piece 1829-1 (or portions thereof) of the seat 1820.

The default position of the piece 1829-2 relative to the piece 1829-1 is in an expanded position, as shown in FIGS. 18A and 18B. In this state, the cavity 1845-2 has a width 1819-2, and the gap 1839-2 between the inner surface 1851-1C of the body 1821-1 of the piece 1829-1 and the outer surface 1852-2B of the body 1821-2 of the piece 1829-2 has a width 1869-2. The width 1819-2 of the cavity 1845-2 can be the same as, or different than, the width 1869-2 of the gap 1839-2. Also, the inner surface 1851-2A of the piece 1829-2 extends inward by a distance 1859-2 relative to the inner surface 1851-1A of the piece 1829-1 when the seat 1820 is in the default (expanded) position.

Piece 1829-3 of the seat 1820 of FIGS. 18A and 18B generally has a rectangular cross-sectional shape with a lateral extension from the bottom of its outer surface 1852-3B. The piece 1829-3 has a body 1821-3 with two outer surfaces 1852-3 (with outer surface 1852-3B being further away from any of the three the inner surfaces 1851-3 relative to the outer surface 1852-3A, where the outer surface 1852-3B is adjacent to the outer perimeter 1856-3B, and where the outer surface 1852-3B forms part of the cavity 1845-1 of the spring system 1840-1), one inner perimeter 1857-3, one inner surface 1851-3, and two outer perimeters 1856-2 (with the outer perimeter 1856-3A positioned between the inner surface 1851-3 and the outer surface 1852-3A, and with the outer perimeter 1856-3B positioned between the outer surface 1852-3A and the outer surface 1852-3B).

The piece 1829-3 of the seat 1820 also includes a spring system 1840-1, which is partly shared with the piece 1829-2, as discussed above. The spring system 1840-1 includes a spring section 1847-1. The cavity 1845-1 of the spring system 1840-1 in this case is located between the inner surface 1851-2B of the piece 1829-2, the inner perimeter 1857-2A of the piece 1829-2, the outer surface 1852-3B of the piece 1829-3, and the outer perimeter 1856-3B of the piece 1829-3, regardless of whether the seat 1820 is in the expanded position (as shown in FIGS. 18A and 18B), a partially consolidated position (as shown in FIG. 19A below), or a fully consolidated position (as shown in FIG. 19B below).

When the seat 1820 is in the expanded position, as shown in FIGS. 18A and 18B, the cavity 1845-1 has a width 1819-1, which shrinks as the seat 1820 moves to a partially or fully consolidated position, as shown in FIGS. 19A and 19B below. Because of the resilient device 1838-1 within the cavity 1845-1 and/or because the maximum width 1869-1 of the gap 1839-1 is less than the maximum width 1819-1 of the cavity 1845-1, the width 1819-1 of the cavity 1845-1 does not reach zero.

The spring section 1847-1 includes a base portion 1842-1 and a protrusion 1844-1 that extends outward to form the inner surface 1851-3 of the piece 1829-3. In this case, the protrusion 1844-1 (and so also the inner surface 1851-3) are substantially vertical. In alternative embodiments, the inner surface 1851-3 can have a large negative slope. In this case, the spring section 1847-1 does not have any sealing members or keys, such as what is discussed above. The piece 1829-3 (or portions thereof) of the seat 1820 can be made of or include the same or a different material relative to the one or more materials of the piece 1829-1 (or portions thereof) and/or the piece 1829-2 (or portions thereof) of the seat 1820.

The default position of the piece 1829-3 relative to the piece 1829-2 is in an expanded position, as shown in FIGS. 18A and 18B. In this state, the cavity 1845-1 has a width 1819-1, and the gap 1839-1 between the inner surface 1851-2C of the body 1821-2 of the piece 1829-2 and the outer surface 1852-3B of the body 1821-3 of the piece 1829-3 has a width 1869-1. The width 1819-1 of the cavity 1845-1 can be the same as, or different than, the width 1869-1 of the gap 1839-1. Also, the inner surface 1851-3A of the piece 1829-3 extends inward by a distance 1859-1 relative to the inner surface 1851-2A of the piece 1829-2 when the seat 1820 is in the default (expanded) position.

The seat 1820 has a height 1867 and a width (thickness) 1868, where the width 1868 can change as the piece 1829-2 and/or the piece 1829-3 move between an expanded (default) position and a consolidated position relative to each other and/or relative to the piece 1829-1. In this example, none of the pieces 1829 of the seat 1820 include any coupling features (such as the coupling features 1792 discussed above) that allow one piece 1829 (e.g., piece 1829-2) to be movably coupled, directly or indirectly, to another piece (e.g., piece 1829-3). The inner perimeter 1857-3 of the piece 1829-3, the inner perimeter 1857-2C of the piece 1829-2, and the inner perimeter 1857-1C of the piece 1829-1 can be substantially planar with respect to each other, regardless of the position (e.g., fully consolidated, partially consolidated, expanded) of the seat 1820.

In this example, the size of the piece 1829-2, the size of the cavity 1845-2, and the size of the resilient device 1838-2 are larger than the size of the piece 1829-1, the size of the cavity 1845-1, and the size of the resilient device 1838-1. Further, the properties (e.g., resistance, resiliency, material) of the resilient device 1838-1 can be the same as, or different than, the corresponding properties of the resilient device 1838-2. Alterations to one or more of the characteristics of one or more of the pieces 1829, the cavities 1845, and/or the resilient devices 1838 can change the contact pressure of the seat 1820 against the wall of the gate valve at relatively low core pressures (e.g., less than 10% of RWP of the gate valve, less than 25% of RWP of the gate valve).

FIGS. 19A and 19B show a subsystem 1999 that includes the seat 1820 of FIGS. 18A and 18B interacting with a gate 1915 for a gate valve according to certain example embodiments. Specifically, FIG. 19A shows the subsystem 1999 with the portion of the seat 1820 shown in FIG. 18B in a partially consolidated position, and FIG. 19B shows the subsystem 1999 with the portion of the seat 1820 shown in FIG. 18B in a fully consolidated position. Referring to FIGS. 1 through 19B, the gate 1915 of the subsystem 1999 can be substantially the same as the gates (e.g., gate 1415) discussed above.

When the seat 1820 is in a partially consolidated position, as in FIG. 19A, the gate 1915 applies a relatively small force against the seat 1820. As a result, the piece 1829-3 of the seat 1820 is pushed inward relative to the piece 1829-2, causing the resilient device 1838-1 to compress as the width 1919-1 of the cavity 1845-1 is reduced from its original width 1819-1. Similarly, the width of the gap 1839-1 is reduced relative to its width 1869-1 when the seat 1820 is in the expanded (default) position.

Since the amount of force that is applied by the gate 1915 against the seat 1820 is relatively small, the gate 1915 in this example only abuts against, without forcing any movement of, the inner surface 1852-2A of the piece 1829-2. As a result, when the seat 1820 is in the partially consolidated position of FIG. 19A, the distance between the inner surface 1851-1A of the piece 1829-1 and the gate 1915 is substantially the same as the distance 1859-2 that the inner surface 1851-2A of the piece 1829-2 extends relative to the inner surface 1851-1A of the piece 1829-1. Also, the size of the resilient device 1838-2 within the cavity 1845-2, the width 1819-2 of the cavity 1845-2, and the width 1869-2 of the gap 1839-2 remain unchanged relative to when the seat 1820 is in the expanded position.

When the seat 1820 is in a fully consolidated position, as in FIG. 19B, the gate 1915 applies a relatively large force against the seat 1820. As a result, the piece 1829-3 of the seat 1820 is pushed inward relative to the piece 1829-2, causing the resilient device 1838-1 to fully compress as the width 2019-1 is reduced from its original width 1819-1 and from its width 1919-1 when the seat is in the partially consolidated position. Similarly, the gap 1839-1 is eliminated so that the outer surface 1852-3B of the piece 1829-3 abuts against the inner surface 1851-2C of the piece 1829-2.

In addition, the gate 1915 pushes the piece 1829-2 of the seat 1820 inward relative to the piece 1829-1, causing the resilient device 1838-2 to compress as the width 1919-2 of the cavity 1845-2 is reduced from its original width 1819-2. Similarly, the width of the gap 1839-2 is reduced relative to its width 1869-2 when the seat 1820 is in the expanded (default) position or the partially consolidated position. Further, the gate 1915 in this example only abuts against, without forcing any movement of, the inner surface 1852-1A of the piece 1829-1. Also, the size of the resilient device 1838-2 within the cavity 1845-2, the width 1919-2 of the cavity 1845-2, and the width 1869-2 of the gap 1839-2 are reduced relative to when the seat 1820 is in the expanded position or in the partially consolidated position.

The force that the gate 1915 applies against the seat 1820 to put the seat in the partially consolidated position, as in FIG. 19A, causes the contact pressure to be elevated and substantially constant for low (e.g., less than 10% of RWP of the gate valve) bore pressures relative to what gate valves and associated seats in the current art can provide (as discussed above with respect to FIGS. 4A, 4B, and 16). As the bore pressure increases (e.g., between 10% and 20% of RWP of the gate valve), the force that the gate 1915 applies to the seat 1820 increases, causing the seat to be in the fully consolidated position, as in FIG. 19B. When this occurs, the contact pressure can have a step increase (e.g., from 6.5 kpsia to 10 kpsia, from 3 kpsia to 7 kpsia) relative to the contact pressure when the seat 1820 is in the partially consolidated position. Eventually, similar to what is shown in FIG. 16 with respect to the gate valve 1400, when the bore pressure reaches a minimum amount (e.g., more than 20% of RWP of the gate valve), the contact pressure increases in a substantially linear manner.

Example embodiments may be used to provide systems and methods for seats for gate valves. Example embodiments result in a relatively high and substantially constant contact pressure within a gate valve at core pressures that are experienced by the gate valve most of the time during operations. As a result, example embodiments greatly reduce or eliminate failures of gate valves in the current art. Example embodiments can be used with new gate valves or retrofit into existing gate valves. Example embodiments may provide a number of benefits. Such benefits may include, but are not limited to, more reliable operation of gate valves, ease of installation and use, reducing downtime, flexibility, configurability, and compliance with applicable industry standards and regulations.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A gate valve comprising:

a valve body;

a bore positioned within the valve body, wherein the bore traverses a width of the valve body and comprises an inlet and an outlet;

a gate slidably disposed within the bore between the inlet and the outlet, wherein the gate, when in a first position within the bore, is configured to allow a fluid to flow within the bore from the inlet to the outlet, and wherein the gate, when in a second position within the bore, is configured to prevent a fluid from flowing therethrough from the inlet to the outlet; and a seat disposed around the bore and adjacent to the gate and the valve body, wherein the seat comprises a first piece and a second piece, wherein the first piece comprises a first seat body having a first inner surface, a second inner surface, a third inner surface, and an outer surface, wherein the second piece comprises a second seat body having a spring system, an inner surface, a first outer surface, and a second outer surface, wherein the inner surface of the second piece is adjacent to the gate, wherein the outer surface of the first piece is adjacent to the valve body, wherein the second inner surface of the first piece and the first outer surface of the second piece are adjacent to each other, wherein the spring system of the second piece comprises a cavity disposed between the second inner surface of the first piece and the first outer surface of the second piece, wherein the spring system of the second piece further comprises a spring section positioned between the cavity and the inner surface of the second piece, wherein the spring section protrudes outward relative to the inner surface of the second piece, wherein the spring section is configured to move inward and reduce a volume of the cavity when the gate contacts the spring section, wherein the first outer surface of the second piece is adjacent to an outer perimeter of the second piece and an intermediate perimeter of the second piece, wherein the first outer surface of the second piece and the second outer surface of the second piece are separated by the intermediate perimeter of the second piece, wherein the first inner surface of the first piece is adjacent to a first intermediate perimeter of the first piece and an outer perimeter of the first piece, wherein the third inner surface of the first piece is adjacent to a second intermediate perimeter of the first piece and an inner perimeter of the first piece, wherein the first inner surface of the first piece and the second inner surface of the first piece are separated by the first intermediate perimeter of the first piece, and wherein the second inner surface of the first piece and the third inner surface of the first piece are separated by the second intermediate perimeter of the first piece.

2. The gate valve of claim 1, wherein the spring section of the spring system of the second piece of the seat is pushed further toward the cavity by the gate when a differential pressure within the bore relative to the gate increases.

3. The gate valve of claim 1, further comprising:

a coupling feature disposed between the first piece and the second piece of the seat, wherein the coupling feature facilitates movement of the second piece relative to the first piece.

4. The gate valve of claim 3, wherein the coupling feature comprises first mating threads on part of the intermediate perimeter of the second piece and second mating threads on part of the outer perimeter of the first piece, and wherein the first mating threads complement and are movably disposed within the second mating threads.

5. The gate valve of claim 3, further comprising:

a first sealing member located on one side of the coupling feature between the first piece and the second piece of the seat; and a second sealing member located on an opposite side of the coupling feature between the first piece and the second piece of the seat.

6. The gate valve of claim 5, wherein the first piece and the second piece engage the first sealing member and the second sealing member for any position of the second piece relative to the first piece while the first piece and the second piece are coupled to each other.

7. The gate valve of claim 1, wherein the spring system further comprises a sealing member disposed in the spring section along the second inner surface of the first piece, and wherein the sealing member is configured to further create a seal with the gate when the gate contacts the spring section.

8. The gate valve of claim 1, wherein the cavity is further located between the the first intermediate perimeter of the first piece and the intermediate perimeter of the second piece.

9. The gate valve of claim 8, wherein the cavity has a resilient device disposed therein.

10. The gate valve of claim 9, wherein the cavity has a width that is greater than a gap between the second outer surface of the second piece and the third inner surface of the first piece when the resilient device is in a fully compressed state.

11. The gate valve of claim 10, wherein the gate further comprises a third piece that is movably disposed relative to the second piece.

12. The gate valve of claim 11, wherein the third piece of the seat has a third seat body having a second spring system, an inner surface, a first outer surface, and a second outer surface, wherein the second piece further comprises a second inner surface and a third inner surface, wherein the inner surface of the third piece is adjacent to the gate, wherein the first outer surface of the third piece is adjacent to the second inner surface of the second piece, an outer perimeter of the third piece, and an intermediate perimeter of the third piece, wherein the second outer surface of the third piece is adjacent to a third inner surface of the second piece and the innermost inner perimeter of the second piece, wherein the first outer surface of the second piece and the second outer surface of the second piece are separated by the intermediate perimeter of the second piece, wherein the first outer surface of the third piece and the second outer surface of the third piece are separated by the intermediate perimeter of the third piece, wherein the second spring system of the third piece comprises a second cavity disposed between the second inner surface of the second piece and the first outer surface of the third piece, wherein the second spring system of the third piece further comprises a second spring section positioned between the second cavity and the inner surface of the third piece, wherein the second spring section protrudes outward relative to the inner surface of the third piece, wherein the second spring section is configured to move inward and reduce a volume of the second cavity when the gate contacts the second spring section, wherein the first outer surface of the third piece is adjacent to the outer perimeter of the third piece and the intermediate perimeter of the third piece, wherein the second outer surface of the third piece is adjacent to the intermediate perimeter of the third piece and the outer perimeter of the third piece, wherein the first outer surface of the third piece and the second outer surface of the third piece are separated by the intermediate perimeter of the third piece, wherein the inner surface of the second piece and the second inner surface of the second piece are adjacent to and separated by a second intermediate perimeter of the second piece, wherein the third inner surface of the second piece is adjacent to the inner perimeter of the second piece and a third intermediate perimeter of the second piece, and wherein the second inner surface of the second piece and the third inner surface of the second piece are separated by the third intermediate perimeter of the second piece.

13. The gate valve of claim 12, wherein the second inner surface of the second piece, the second intermediate perimeter of the second piece, the first outer surface of the third piece, and the intermediate perimeter of the third piece forms the second cavity.

14. The gate valve of claim 13, wherein the second cavity has a second resilient device disposed therein.

15. The gate valve of claim 14, wherein the second cavity has a second width that is greater than a second gap between the second outer surface of the third piece and the third inner surface of the second piece when the second resilient device is in the fully compressed state.

16. The gate valve of claim 1, further comprising:

a second seat disposed around the bore adjacent to the gate and the valve body, wherein the second seat comprises a third piece and a fourth piece, wherein the third piece comprises a third seat body having a first inner surface, a second inner surface, a third inner surface, and an outer surface, wherein the fourth piece comprises a fourth seat body having second spring system, an inner surface, a first outer surface, and second outer surface, wherein the inner surface of the fourth piece is adjacent to the gate, wherein the outer surface of the third piece is adjacent to the valve body, wherein the second spring system of the fourth piece comprises a second cavity disposed between the second inner surface of the third piece and the first outer surface of the fourth piece, wherein the spring system further comprises a second spring section positioned between the second cavity and the inner surface of the fourth piece, wherein the second spring section protrudes outward from the inner surface of the fourth piece, wherein the second spring section is configured to move inward and reduce a volume of the second cavity when the gate contacts the second spring section.

17. A seat for a gate valve, the seat comprising:

a first piece comprising a first seat body having a first inner surface, a second inner surface, a third inner surface, and an outer surface, wherein the outer surface of the first piece is configured to be adjacent to a valve body; and a second piece comprising a second seat body having a spring system, an inner surface, a first outer surface, and a second outer surface, wherein the inner surface of the second piece is configured to be adjacent to a gate, wherein the second inner surface of the first piece and the first outer surface of the second piece are configured to be adjacent to each other, wherein the spring system comprises:

a cavity disposed between the second inner surface of the first piece and the first outer surface of the second piece, wherein the spring system further comprises a spring section positioned between the cavity and the inner surface of the second piece, wherein the spring section comprises a protrusion that is tapered toward a bottom end of the second seat body, wherein the protrusion protrudes outward relative to the inner surface of the second piece, wherein the spring section is configured to move inward and reduce a volume of the cavity when the gate contacts the protrusion of the spring section, wherein the spring section is configured to revert to its default position, thereby allowing the volume of the cavity to be restored, when the gate no longer contacts the protrusion, wherein the first outer surface of the second piece is adjacent to an outer perimeter of the second piece and an intermediate perimeter of the second piece, wherein the first outer surface of the second piece and the second outer surface of the second piece are separated by the intermediate perimeter of the second piece, wherein the first inner surface of the first piece is adjacent to a first intermediate perimeter of the first piece and an outer perimeter of the first piece, wherein the third inner surface of the first piece is adjacent to a second intermediate perimeter of the first piece and perimeter of the first piece, wherein the first inner surface of the first piece and the second inner surface of the first piece are separated by the first intermediate perimeter of the first piece, and wherein the second inner surface of the first piece and the third inner surface of the first piece are separated by the second intermediate perimeter of the first piece.

* * * * *